United States Patent [19]

Fernandes et al.

[11] Patent Number: 5,490,134
[45] Date of Patent: Feb. 6, 1996

[54] VERSATILE COMMUNICATIONS CONTROLLER

[75] Inventors: Roosevelt A. Fernandes, Chino Hills; Patrick C. Fitz, Livermore, both of Calif.

[73] Assignee: Southern California Edison Company, Rosemead, Calif.

[21] Appl. No.: 84,303

[22] Filed: Jun. 29, 1993

[51] Int. Cl.$^6$ .................................................. H04J 3/22
[52] U.S. Cl. ........................... 370/79; 370/85.8; 370/95.2; 340/825.06; 340/825.08; 364/221.5
[58] Field of Search ................. 340/825.06, 825.08, 340/825.15, 825.16; 370/79, 85.13, 85.8, 95.2

[56] References Cited

U.S. PATENT DOCUMENTS

| | | | |
|---|---|---|---|
| 4,445,213 | 4/1984 | Baugh et al. | 370/94 |
| 4,549,291 | 10/1985 | Renoulin et al. | 370/89 |
| 4,642,760 | 2/1987 | Yanai et al. | 364/200 |
| 4,796,027 | 1/1989 | Smith-Vaniz | 340/825.06 |
| 4,839,890 | 6/1989 | Semerau et al. | 370/84 |
| 4,888,769 | 12/1989 | Deal | 370/50 |
| 4,893,306 | 1/1990 | Chao et al. | 370/94.2 |
| 4,954,950 | 9/1990 | Freeman et al. | 364/200 |
| 4,979,169 | 12/1990 | Almond et al. | 370/79 |
| 5,012,469 | 4/1991 | Sardana | 370/95.3 |
| 5,012,470 | 4/1991 | Shobu et al. | 370/110.1 |
| 5,072,444 | 12/1991 | Breeden et al. | 370/94.1 |
| 5,086,425 | 2/1992 | Le Goffic et al. | 370/84 |
| 5,086,426 | 2/1992 | Tsukakoshi et al. | 370/85.13 |
| 5,094,837 | 3/1992 | Franklin et al. | 370/60.1 |
| 5,103,447 | 4/1992 | Takiyasu et al. | 370/85.15 |
| 5,107,492 | 4/1992 | Roux et al. | 370/85.6 |
| 5,113,392 | 5/1992 | Gupta et al. | 370/84 |
| 5,117,425 | 5/1992 | Ogata | 370/110.1 |
| 5,121,390 | 6/1992 | Farrell et al. | 370/94.1 |
| 5,124,984 | 6/1992 | Engel | 370/94.1 |
| 5,153,884 | 10/1992 | Lucak et al. | 371/32 |
| 5,163,131 | 11/1992 | Row et al. | 395/200 |
| 5,182,748 | 1/1993 | Sakata et al. | 370/94.1 |
| 5,184,347 | 2/1993 | Farwell et al. | 370/94.1 |
| 5,184,348 | 2/1993 | Abdelmouttalib et al. | 370/95.1 |
| 5,187,708 | 2/1993 | Nakatani et al. | 370/85.1 |
| 5,241,539 | 8/1993 | Obermeier | 370/79 |

*Primary Examiner*—Douglas W. Olms
*Assistant Examiner*—Russell W. Blum
*Attorney, Agent, or Firm*—Merchant, Gould, Smith, Edell, Welter & Schmidt

[57] ABSTRACT

A communication system uses controllers for bi-directional protocol conversion. There is a plurality of remote signal inputs comprised of supervisory control and data acquisition (SCADA) signals, and/or remote terminal unit (RTU) signals, and/or instrumentation monitoring signals, and/or instrumentation control signals having different protocols. The signals are either in synchronous and asynchronous data formats and include voice inputs. Multiplexing such signal inputs into a composite signal is effected for transmission over electronic and physical communication media using X.25 or higher protocol, at an aggregate transmission data rate of 9.6 Kbps or faster. One or more controller can be configured as the master of remote units. Such units can perform remote signal input emulation; master/remote apparatus emulation, permits user-defined signal port control access; and provides operational diagnostics of the units and their associated communication link.

46 Claims, 19 Drawing Sheets

MULTI-COMMUNICATION MEDIA CAPABILITY OF VCC

MULTI-COMMUNICATION MEDIA CAPABILITY OF VCC

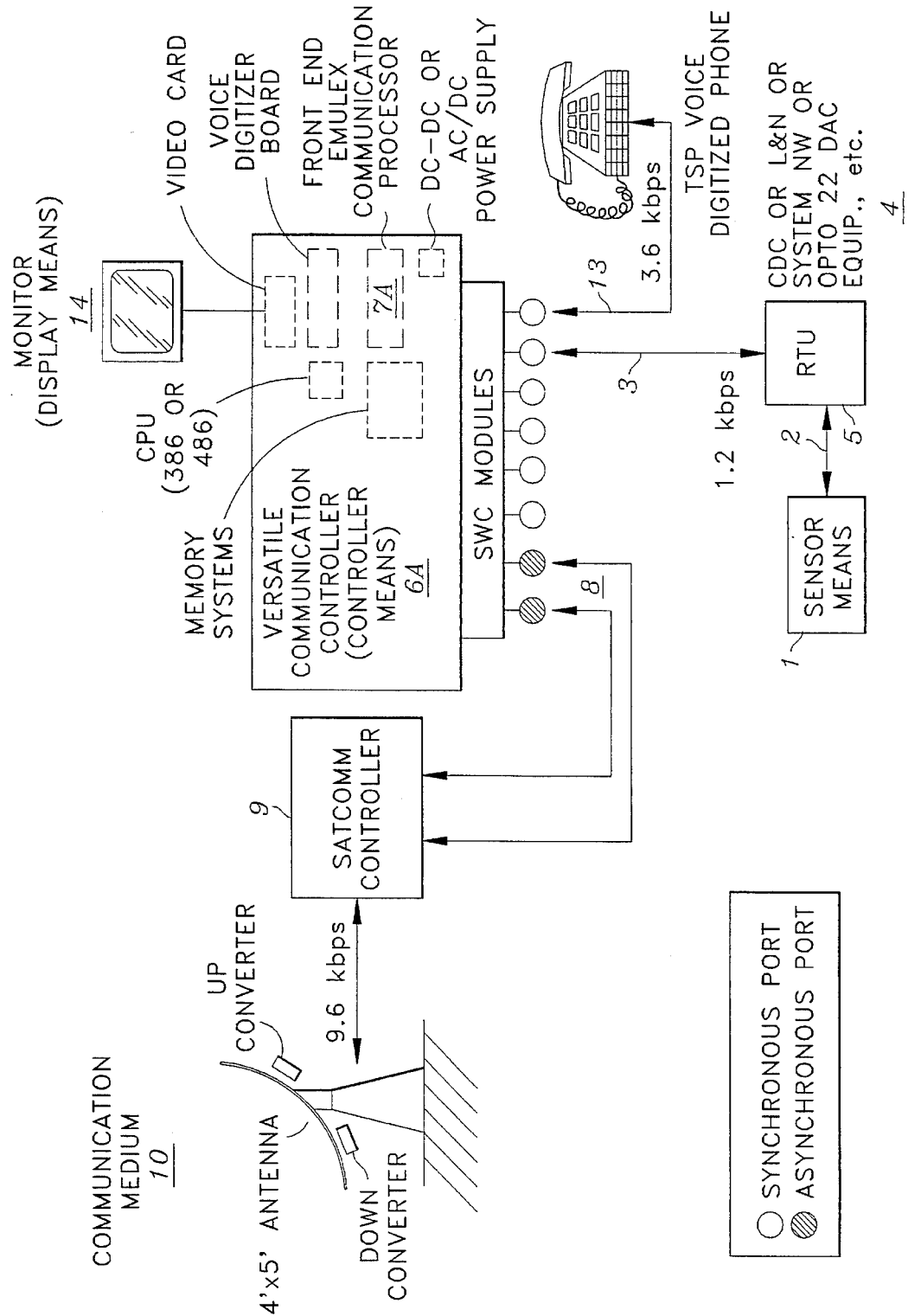

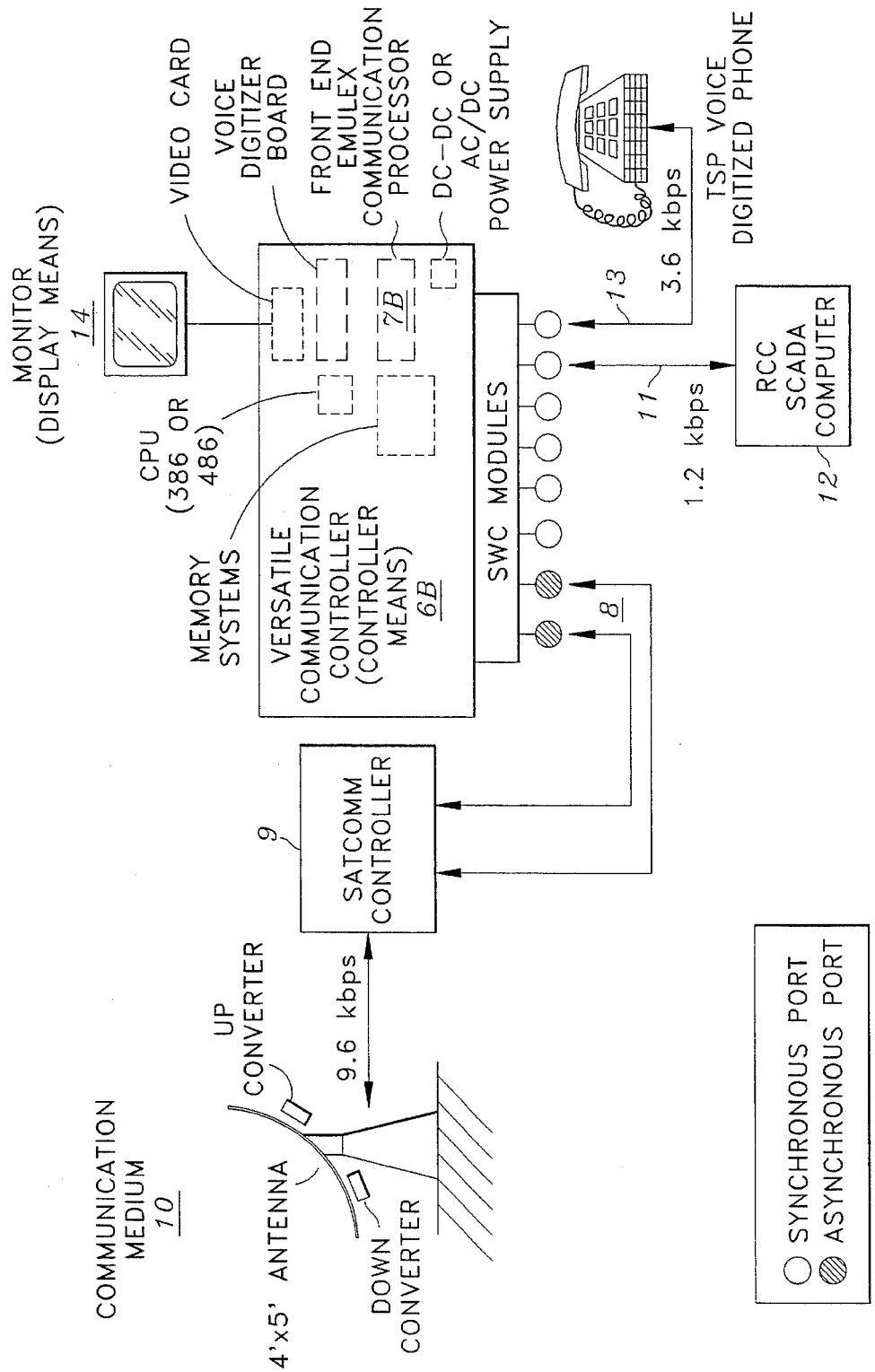
FIG. 2B CENTRAL SUBSTATION SATCOMM EQUIPMENT

OS/2 MULTI-TASKING VCC SYSTEM ARCHITECTURE
(TOP LEVEL)

DATA BASE RECEIVER PROCESS

DATA FLOW FOR VCC SOFTWARE COMPONENTS INTERFACE DIAGRAM

VCC OPERATING STATES

INITIALIZATION DATA FLOW BLOCK DIAGRAM
CENTRAL.EXE

DATA FLOW FOR DATABASE RECEIVER PROCESS

DATA FLOW FOR DATABASE TRANSMIT PROCESS
X.25_DBX.EXE

DATA FLOW RMU EMULATION PROCESS
RMU_EMU.EXE DATA FLOW

DATA FLOW FOR OPTO 22 SYNTHETIC MASTER PROCESS

DATA FLOW CDC SYNTHETIC MASTER PROCESS

DATA FLOW FOR CDC SYNTHETIC RTU PROCESS

DATA FLOW TSP DIAL PROCESS

STRUCTURE FOR CENTRAL.EXE

STRUCTURE X.25-DBR.EXE

SYSTEM OPERATING MODES

SYSTEM ARCHITECTURE
SEND_TO_DB X.25_DBR

SYSTEM MODES OF OPERATION

SYSTEM ARCHITECTURE
DATA_BASE_TRANSMIT OPERATING MODE

SYSTEM ARCHITECTURE
WRITE_COM

SYSTEM OPERATING MODE
MASTER RTU SYSTEM ARCHITECTURE

SYSTEM OPERATING MODE
SYSTEM ARCHITECTURE – RTU_CDC

STRUCTURE OF CDC SM.EXE PROCESS
CDC SYNTHETIC RTU

SYSTEM ARCHITECTURE
STRUCTURE DIAGRAM OF POLL_READ ROUTINE

VERSATILE COMMUNICATIONS CONTROLLER

BACKGROUND

Being able to communicate between remote stations and a central control station effectively through communication links is important to power-generating utilities.

This invention relates to a communication system. In particular, the invention is concerned with such a system for use between a central station and remote stations in a power-generation system for utilities.

Utilities have difficulty incorporating more modern monitoring and control equipment with their more efficient protocols, without making expensive changes in existing Supervisory Control and Data Acquisition (SCADA) applications software. Utilities have therefore been constrained to use old equipment specifications in the procurement of new power system monitoring and control hardware.

This invention seeks to overcome the disadvantages of existing monitoring and control communication networks.

SUMMARY

By this invention, there is provided a communication controller which minimizes the prior disadvantages.

According to the invention, there is provided and apparatus for communicating signals having multiple different protocols as a composite signal with at least one common protocol, including monitoring and/or control through multiple ports.

Multiple input means receives respective input signals in protocols selected from multiple protocols. At least several of the multiple signals having one of a different protocol from the multiple protocols, First controller means receive the inputted signals and include means for multiplexing the input signals to a composite signal having a common protocol.

Output means receive the composite signal in the common protocol and transmit the composite signal in the common protocol through a communication medium to a second location.

There is at least one second controller means with input means for receiving the composite signal from the communication medium. In the second controller there is means for demultiplexing the composite signal into multiple output signals having the respective multiple different protocols.

The communication is effected between multiple remote stations and a central station. The first location receives multiple input monitoring signals and transmits them to the second location which is a central station for receiving the monitoring signals as the composite signal. Also, the central station can input the multiple control signals and transmit them as a composite control signal. The control signal is received at the remote station and is demultiplexed into the multiple control signals.

At the central station, the output means present the outputted signals as monitoring signals. The outputted signals at the central station are substantially the same as the inputted monitored signals at the remote station.

At the remote station, the output means present the outputted signals as control signals, such that the outputted signals are substantially the same as the inputted signals at the central station.

There are also means for selectively communicating signals representative of voice between selected different remote stations independently of a central station.

A multiple input means to the controller means includes multiple serial inputs. At least some of these inputs selectively have similar protocols with each other. The multiple protocols can be received selectively in a synchronous or asynchronous data format.

When the controller means has means for receiving voice signals, the voice signals are digitized and multiplexed for transmission in the common protocol. There is also means for displaying the monitoring and control signals as the case may be at either the remote stations or the central station. Where there are multiple remote stations, these may be controlled by a single central control station which receives the monitoring signals. Either central stations may simply monitor remote stations without having the ability to control the remote stations.

The common protocol is at least as high as an X.25 protocol and the communication medium is selected to be at least one of an electronic, fiber optic, satellite or physical medium.

The facility of the controller permits monitoring and control of the particular electrical apparatus through the RTU.

The controller means is referred to as a versatile communications controller (VCC) communicates and controls multiple colocated or remote devices connected to various substation equipment, with some using different protocols. The VCC also combines a plurality of digital data and digitized voice signals into a composite signal. This is communicated to one or more other locations where a second VCC transforms the signal to a plurality of digital data and voice signals, while compensating for signal path delays.

The VCC provides an interface to substation monitoring and control devices and emulates SCADA devices. The VCC allows the network to use a protocol most suited to a particular communication medium. It can simultaneously allow compressed voice traffic using an internal voice compression card.

Each VCC can support a total of at least six asynchronous and two synchronous serial devices simultaneously using different individual protocols.

Multiple remote master locations can be used to monitor the same device connected to the VCC. If desired only one pre-designated master site can send a control signal through it. At a given substation the VCC will allow local display of all the data that can be remotely monitored, on its own CRT. With the VCC several types of devices using different protocols can be used on the network without requiring any costly power system control application software changes.

The VCC allows communications, for example, between remote devices via an X.25 satellite network with some of the devices connected via a fiber optic or microwave link. The VCC does this by establishing a Switched Virtual Circuit on the network. Software programs running on the VCC can read the incoming network data and translate this information, depending on the target device, to the appropriate protocol. This information is then forwarded to the destination device for interpretation.

The VCC preferably uses an IBM OS/2 as the multi-tasking operating system. However, it can be adapted to another multi-tasking operating system, such as, UNIX providing adequate random access memory is provided.

Three software components are used:

(1) DCP/MUXi down load code that runs on the DCP/MUXi serial communications board from Emulex Corp.

(2) OS/2 Communications Driver which is the kernel level component that provides the means for application programs to communicate with the DCP/MUXi;

(3) OS/2APs which provides a man/machine interface that allows communication and control signals to be sent to the equipment connected to the remote VCC.

The VCC allows simulation of the master controller at the remotely controlled device location when satellite communications is used and also simulates the Remote Terminal Unit (RTU) at the master control site.

The VCC permits utilities to continue to get maximum use from older substation equipment without limiting the new monitoring and control equipment to older, less efficient interface specifications. This also helps utilities to protect the millions of dollars in existing power system control applications software.

The VCC represents a hardware and software configuration for substation digitized compressed voice communications, monitoring and control. It can also serve as a remote substation display monitor for viewing the power flows through incoming and outgoing circuits, currents, voltages and other quantities. The monitored alarm, control and status points can be displayed in a manner similar to the Regional Control Center or master SCADA console displays.

In effect the VCC replaces all of the individual substation analog meters and alarm status panels. This greatly assists travelling operators and field technicians in substation failure analysis and trouble shooting with help from the supervisory location viewing the same information.

This VCC relates to a multi-ported, multi-protocol, PC-AT based communications controller. The VCC is intended to operate in the harsh electro-magnetic environment of a substation and to interface with RTU's used to control and monitor a variety of substation equipment.

The VCC acts as a universal communications and control interface with other devices such as Opto-22 equipment using different protocols.

At the master SCADA location identical VCC hardware with complementary software presents a communication and control link to the SCADA computers using the existing or specified protocol in a transparent manner. This transparency is provided by the VCC regardless of the wide range of protocols, communication link time delays, and other variations commonly found with substation equipment spanning several decades.

Displays at the first location or second location can be in real time or later time. Polling time intervals can be adjusted as necessary for multiple second locations. Various common protocols can be used. Data can be stored as monitored data by multiple selected protocols. Without interrupting collection of monitoring signals at the first location, the number of monitoring signals at the first location can be changed.

The invention also includes the method of communication and the system for communication.

The invention is further described with reference to the accompanying drawings.

DRAWINGS

FIGS. 2A and 2B are block diagrams of the VCC in association with a communication link, respectively a remote station and a central station which is a regional station.

DESCRIPTION

Figure 1:
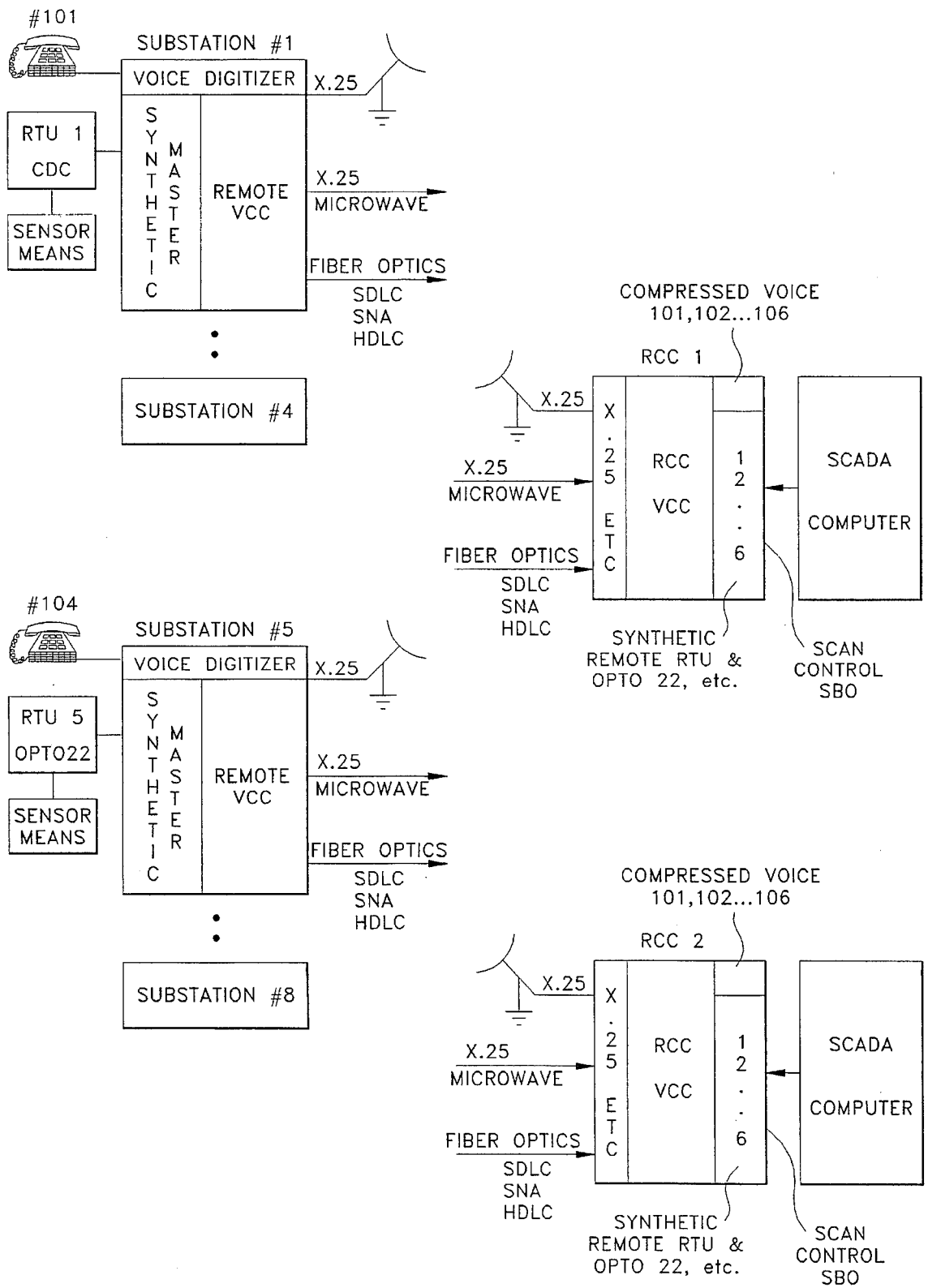
FIG. 1 is a block diagram depicting the multi-communication media capability of the VCC and its ability to handle multiple protocols.

To facilitate the description, the Applicant sets out a table of acronyms as used in this application:

| ACRONYM | SUBJECT |
| --- | --- |
| AC/DC | Alternating current-to-direct current |
| AGC | Automatic Generation Control |
| ASCII | A data character data format, typically the format produced by a keyboard output |
| BISYNC | Bi-Synchronous Communications |
| BOIS | Built-in Operating System |
| CDC | Control Data Corporation |
| CPU | Central Processing Unit |
| CTS | Clear to Send |
| D/A | Digital to Analog (converter) |
| DC/DC | Direct current-to direct current |

-continued

| ACRONYM | SUBJECT |
| --- | --- |
| DCD | Digital Communication Devi |
| DCE | Data Communications Equipment |
| DCP/MUXi | Digital Communication Processor/ Intelligent Multiplexer |
| DMA | Demand Assigned Multiple Access |
| DIN | Digital Network Terminal Connector |
| DTE | Data Terminal Equipment |
| DTR | Data Terminal Ready |
| EMI | Electromagnetic Interference |
| ESD | Electro-Static Discharge |
| FCP | Front-end Communications Processor |
| IBM | International Business Machines Corporation |
| IDE | Internal Disk Equipment |
| IEEE | Institute of Electrical and Electronic Engineers |
| I/O | Input/Output (terminals) |
| Kbytes | One thousand bytes (of data) |
| L&N | Leeds & Northrop Corporation |
| Mbytes | One million bytes (of data) |
| MHz | One million hertz (or one million cycles per second) |
| Opto-22 | A model number, for a SCADA, as manufactured by Opto |
| OS/2 | A multi-tasking computer operating system |
| OS/2AP | IBM OS/2 Operating System Application |
| PC | Personal Computer |
| PC-AT | Personal Computer, having model number AT, as manufactured by IBM |
| PCB | Printed Circuit Board |
| RS-232C | An interface standard, identifies connector pin assignments/functions for specific cables |
| RS-422 | An interface standard, identifies cable connector pin assignments/functions for specific cables |
| RTS | Ready to Send |
| RTS/CTS | Ready to Send/Clear to Send |
| TSP | Time & Space Processing |
| RAM | Random Access Memory |
| ROM | Read Only Memory |
| RTU | Remote Terminal Unit |
| SBO | Select-before-operate |
| SCADA | Supervisory Control and Data Acquisition |
| SNA | Synchronous Network Architecture (IBM) |
| SWC | Surge Withstand Capacity |
| UNIX | A multi-tasking computer operating system |
| VCC | Versatile Communications Controller |
| VDC | Voltage -- Direct Current |
| VGA | Very Good Graphic Display Matrix Array for high resolution |
| X.25 | Packet Switching Synchronous Multi-Layer Protocol |

Overall System

As illustrated in FIG. 2A, an apparatus system and method for communicating monitoring and control signals comprises multiple sensor means 1 for initiating and receiving RTU input signals 2. The RTU input and output signals 3 can be any one or several protocols 4. The RTU 5 also inputs and outputs signals 3 in one of several protocols 4. The RTU input and output signals 3 are representative of monitoring and control signals at a remote power utility substation. These RTU input and output signals 3 would be obtained from sensors and/or transducers or signal communicating equipment governing the operation of equipment at the remote substation.

The RTU input and output signals 3 are representative of status and control signals at the remote substations. The multiple input and output signals 3 have one protocol selected from the multiple protocols 4. The selected protocol 4 is determined by the characteristics, for instance, of monitoring and control at the remote substations. The control signal 3 is for purposes of controlling the equipment at the remote substation, and the control signals are sent in the protocol 4 appropriate for the RTU at the remote substations.

There can be multiple first locations, (i.e., remote substations) which have a first controller means 6A. Each of these controller means 6A would receive monitoring signals from the RTU 5 at the remote substations. The controller means 6A at each remote substation also outputs the control signals 3 to the RTU 5.

The controller means 6A at each of the remote substations includes means 7A for multiplexing the inputted signals 3 to provide a composite monitoring signal 8 having a common protocol. The controller means 6A at the remote substations also include means 7A for demultiplexing a composite signal 8 in the common control protocol into control signals 3 to the RTU-5.

There are also output means 9 for transmitting and receiving the composite monitoring and control signals 8 in the common protocol. The transmission and receipt in the common protocol is directed to a communication medium 10 to at least one second location as illustrated in FIG. 2B. At the second location which is a central substation or master station there is a second controller means 6B. There is receiving means 9 for receiving the composite signal 8 from the communication medium 10. There is means 7B in the second controller for demultiplexing the composite signal 8 into multiple output signals 3.

There is also means for demultiplexing the composite signal 8 into multiple signals 7 within the second controller 6B, to form a composite signal 11.

The output means is provided in the second controller means 6B for presenting the output signals at the second location as monitoring signals 11. There are means within the first controller 6A for presenting the control signal at the first location.

There is also means 13 for selectively communicating signals representative of voice between different first locations, namely remote substations, independently of the second locations, namely one or more central substations.

There are software means within the controller means 6 for selectively receiving and using control signals at one or more remote substations. Such selected first controller means 6A are able to monitor signals 8 from the central substation located at the second location.

The system also provides display means 14 associated with the first controlling means 6A at the remote substations. These displays can monitor data in an integrated mode at the remote stations.

In the manner described, the output monitored signals 11 at the second controller means 6B are the same as the input RTU signals 3 at the first controller means 6A. In this sense, the communication would be essentially transparent to the RCC SCADA computer means 12. Thus, the central substation is effectively the same as a monitoring the RTU at the remote substation.

Similarly, control signals which emanate from the second location, namely, the central substation, are transmitted by the second controller means 6B through the communication medium 10 and to the first controller 6A. The control signals are outputted by the first controller 6A to the RTU 5 as if they had been generated by the central substation. In this sense, the communication medium 10 between the first controller 6A and the second controller 6B is essentially transparent.

The first controller means 6A and second controller means 6B include inputs which are of a multiple serial nature. At least some of the inputs 3 and 11, respectively, may selectively have similar protocols with each other. The multiple protocols can include a synchronous or asynchronous data format.

The common protocol 8 is at least as high as an X.25 protocol. The communication medium 10 is selected to be at least of an electronic, fiber optic, satellite, radio, microwave or physical mediums such as twisted copper wire. At the remote stations, the sensor means 1 which can be associated with the instruments can be integrated into the controller means 64 at the remote stations.

The first controller means 6A includes means for polling multiple sensor means 1 to obtain a polled input signal 2. The second controller means 6B includes means for polling multiple remote substation controller means 6A to obtain a polled input signal 11. In this fashion, the second controller means 6B at the central substation has the ability to selectively or randomly chose a particular signal to be monitored. Polling can be affected regularly as required.

Further details of the system, apparatus and method are now described with reference to the flow diagrams illustrating the multiplexing and demultiplexing of signals in converting them between multiple different protocols and the composite protocols.

Figure 3:
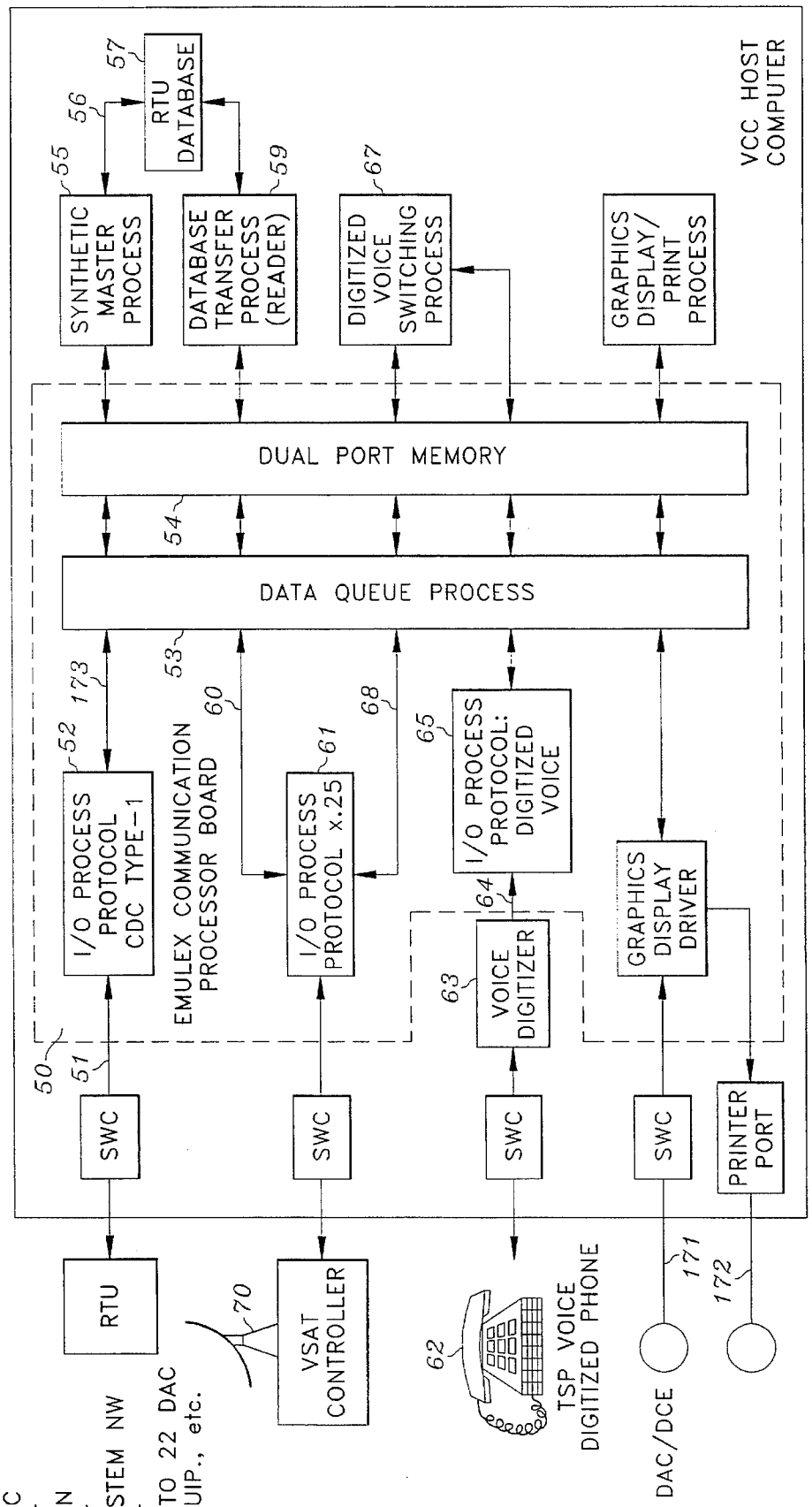
FIG. 3 shows the manner in which the VCC hardware is configured for deployment at an RTU site.
Figure 4:
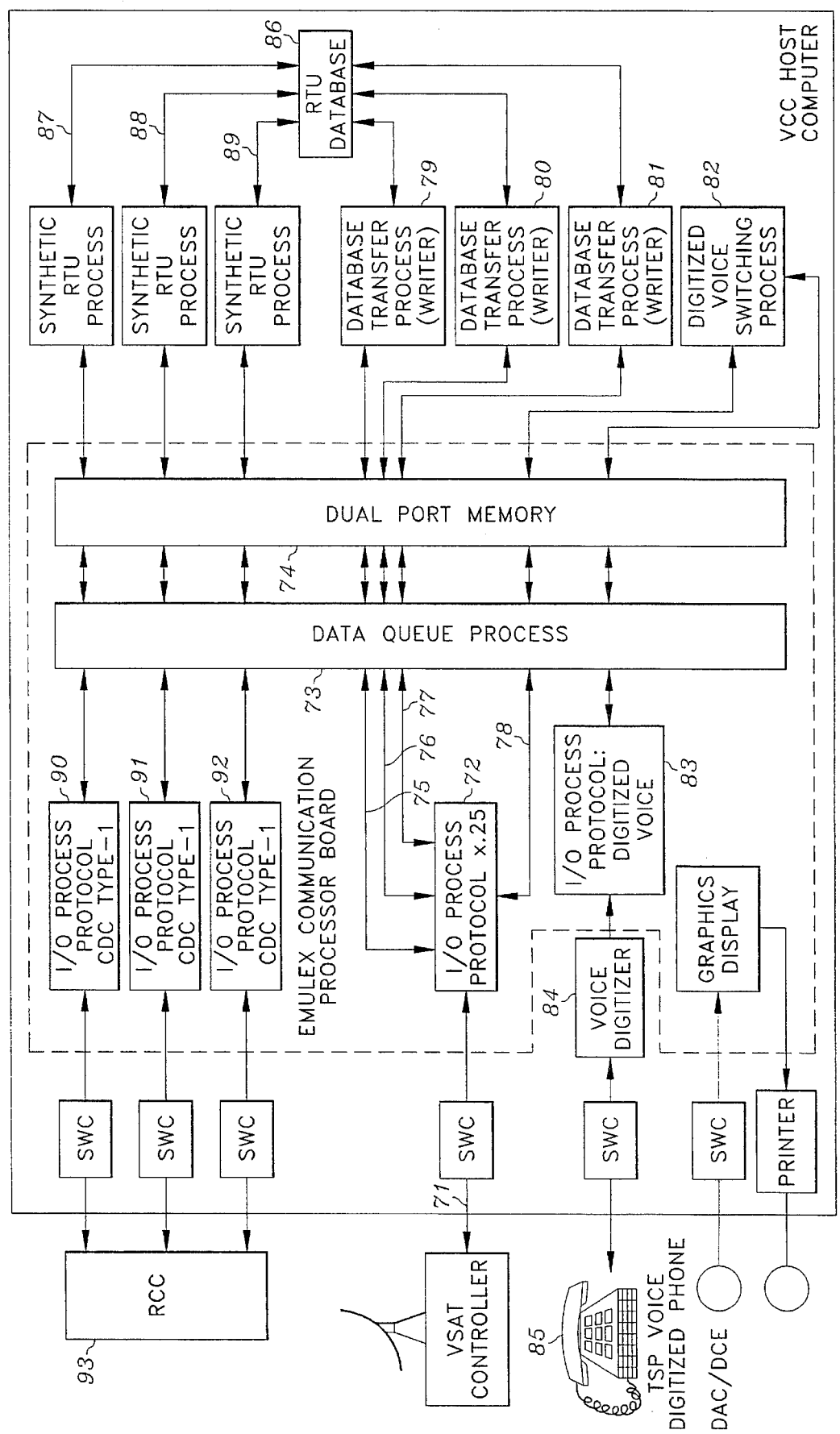
FIG. 4 shows the VCC at a Regional Control Center site.

In each of FIGS. 3 and 4, there is the Emulex Communication Processor Board which acts to multiplex or demultiplex, as the case may be, signals between the selected different protocol into a common X.25 protocol serial data stream. The board used in the controller is obtained from Emulex Corporation in Costa Mesa, Calif., but is modified for efficient use of the phase lock loop feature of the MUXi 50.

With reference to FIG. 3, a controller at a remote substation illustrates input signals from the RTU into the Emulex card 50 along line 51. The signals flow through the I/O Process 52 where the site specific RTU protocol is converted to computer RTU Database format. The data then proceeds to the Data Queue Process 53 and Dual Port Memory 54, which act as a buffer. This process is initiated by a poll from the Synthetic Master Process 55. The Synthetic Master Process 55 stores the data in the RTU Database 57 following along line 56. When a poll is received from the RCC VCC, the data from the RTU Database follows line 58 to the Database Transfer Process (Reader) 59 where it is converted into X.25 protocol. From there, the data enters the Dual Port Memory 54 and the Data Queue Process 53, which act as buffers to the I/O process X.25 protocol 61. The data then enters the I/O Process Protocol X.25 61 along line 60 for transmission to the RCC VCC.

A voice line from the TSP Voice Digitized Phone 62 passes through a Voice Digitizer card 63 prior to entering the I/O Process Protocol Digitized Voice 65 along line 64. The voice data then enters the Data Queue Process 53 and Dual Port Memory 54. The voice data is passed along line 66 to the Digitized Voice Switching Process 67, where it is converted from digitized voice protocol to X.25. The data then re-enters the Dual Port Memory 54 and Data Queue Process 53, which act as buffers for the I/O Process Protocol X.25 into a composite signal using X.25 protocol along lines 68 and 60, respectively. From there, the composite signal follows line 69 through the SWC card to the VSAT Controller 70, where the signal is transmitted to the Central (RCC) substation. Other communication lines 171 are provided for the terminal DAC/DCE. A printer port is provided along line 172.

The Regional Control Center VCC receives the X.25 data through the VSAT Controller 70 and stores the same in a buffer address for a particular remote RTU after it is demuxed through a reverse process. When the SCADA computer 93 polls the colocated VCC, the RTU data is provided from this database.

An incoming signal from the RCC VCC to the remote VCC enters the SWC card and the Emulex Communication Processor Board 50. Once in the I/O Process Protocol X.25, the signal is demultiplexed into its components: the RTU data (control functions, polling commands, etc.) and the voice data. The RTU data follows line 60 into the Data Queue Process 53 and the Dual Port Memory 54, which act as a buffer to the Database Transfer Process (Reader) 59. At the Database Transfer Process (Reader) 59, the data is converted from X.25 protocol to computer RTU Database format. The data then follows line 58 to the RTU Database, where it interprets the command. The command data are passed on to the Synthetic Master Process 55.

If the command is a control function for the RTU, the Synthetic Master Process acts like the RCC SCADA computer and issues the control function command to the RTU. The command enters the Dual Port Memory 53 and the Data Queue Process 54, and then follows line 173 to the I/O Process Protocol 52. As illustrated, this is a CDC Type-1 protocol. It can be a different protocol for a different RTU. The data is converted here to the protocol being used by the site's RTU (CDC Type-1 or Opto-22 or L&N or System N.W.). The command data then follows line 51 out through the SWC card and into the RTU. The RTU then performs the command.

If the command data is a polling request, the Synthetic Master Process 55 reads the stored RTU data in the RTU Database 57 and sends it back along path 58 to be sent back to the RCC. The Synthetic Master Process 55 polls the RTU through the above process after a fixed interval so that when the polling request comes from the RCC, the RTU Database data is current. The demultiplexed voice data passes through the buffers 53 and 54 to the Digitized Voice Switch Process 67. It is converted from X.25 to digitized voice protocol. It is sent back to the buffers 53 and 54, and in turn, to the I/O Process 65. It then passes to a Voice Digitizer card 64 which converts the digital data to analog which is then outputted to the phone 62.

In FIG. 4, there is an antenna for receiving satellite communication in the common X.25 protocol and transmitting it into the controller at the RCC along line 71. This signal contains both SCADA and voice data from multiple RTU's at respective multiple first locations. This data gets demultiplexed in the I/O Process (protocol X.25) 72 from where it is passed to the Data Queue Process 3 and Dual Port Memory 74 along line 75, 76, 77 and 78. The data is used by several OS/2 processors, namely Database Transfer Process (Writer) 79, 80 and 81, and the Digitized Voice Switching Process 82.

For the voice data, the X.25 protocol is converted into digitized voice protocol in the Digitized Voice Switching Process 82. It then passes the data back to the Data Queue Process 73 and Dual Port Memory 74. Then it is passed to the I/O Process 83 which sends the data to a Voice Digitizer card 84 which in turn converts digital data into analog voice for the TSP Voice Digitizer Phone 85.

The SCADA data on the other hand gets converted from X.25 protocol to computer RTU Database format in the Database Transfer Process (Writer) 79, 80 and 81. The data is then stored in the RTU Database 86. The individual Synthetic RTU Process 87, 88, and 89, each representing an RTU from a remote substation, polls the RTU Database 86 at a certain time interval. The SCADA data then passes through the buffer of the Dual Port Memory 76 and the Data Queue Process 73 to different I/O Processes 90, 91, 92.

These I/O processes convert the data from computer RTU Database format into CDC-Type 1 protocol (or any other protocol used by the RCC SCADA Computer 93). The SCADA data is now usable by the RCC SCADA computer.

The control signals generated by the RCC SCADA computer to the remote RTU's would have the reverse process.

For illustrative purposes in FIG. 1, substation 1 can have a remote substation monitoring and control RTU using a CDC Type 1 protocol, and a compressed voice digitizer with a unique address. The RTU monitoring and control SCADA traffic can be directed to Regional Control Center (RCC) 1, while the voice traffic could be simultaneously directed to RCC 2, at a second location.

Substation 5 could have an Opto-22 monitoring and control unit which can be converted by the VCC to a X.25 protocol and the compressed voice simultaneously transmitted as before. The VCC converts all the inputs to an X.25 Satcomm network protocol for transmission over the satellite network. The VCC recognizes delays over the SatComm network and compensates for it by emulating the RTU at the master SCADA controller location and a second VCC at the Regional Control Center emulates several remote RTU's providing immediate hand shaking with the SCADA Master computer in a protocol transparent fashion.

VCC Hardware Configuration

The VCC has been built to take advantage of the mass production volume of a PC-AT platform. Given the demanding environment of substation applications an industrialized PC-AT compatible platform with a dustproof enclosure, and passive backplane may be used to provide greater reliability. For utility remote substation applications this invention assumes use of the following hardware elements:

1. Industrialized PC-AT computer using a dust proof enclosure, fan, passive back plane, complete with a central processing unit(CPU), keyboard, monitor, floppy and hard disk drives, and preferably driven by a nominal 48 V DC or 130 V DC power supply.

2. An Emulex type multi-ported communications processor expansion board. This board for satellite network applications is configured for two synchronous and six asynchronous serial communication digitized data streams using an RS-232C interface.

3. A digitized voice compression expansion card such as a Time and Space Processing PC-AT voice digitizer.

The VCC has to withstand the EMI environment of a high voltage substation. Both steady state and high voltage transient or switching surges must be withstood by the equipment. Therefore the power supply and all external RS-232C interface connectors must be connected to in-line switching surge protection cards which are located at each input connector interface. This protects all internal cards from external surges propagating either through the interconnecting cables or coupled through space.

FIG. 2 shows the VCC element connections as a block diagram. The 386/486 CPU, front-end Emulex communications processor, voice digitizer board, and internal DC—DC or AC/DC power supply. There are memory systems with at least 4 MB of RAM, all connected to a passive back plane architecture.

The VCC central processing unit, also known as the host processor, is an 80386 class processor or better. A minimum of 4 MB of RAM is provided for the multi-tasking OS/2 operating system used for the VCC. The host CPU is selected to provide at least two serial ports (RS-232/RS-422) with one parallel port. At a minimum the CPU is also selected to provide 7 DMA channels, 3 timer channels, and 15 or more vectored interrupts. A programmable, battery-backed calendar and clock are located on the CPU board.

The host CPU is controlled by an AWARD type built-in operating system (BIOS) located in on-board ROM. This allows boot-up of the VCC with or without a key board. As a communications controller, once the VCC is configured for a particular substation or SCADA master site then the key board could be locked away to avoid inadvertent disruption of the communications function. Use of an OS/2 operating system for the VCC allows a single unit to monitor and control several RTU's and a voice circuit with an X.25 interface with a satellite communications controller or an SNA type environment.

Front-End Communications Processor

The VCC includes an Emulex Corp. DCP/MUXi Front-End Communications Processor (FCP) board (Model #DCP/MUXi-8-512), installed in one of the expansion slots on the PC/AT bus and with the appropriate OS/2 Driver and down load and kernel software allows communication with up to eight serial ports simultaneously. Two of the serial ports are synchronous.

The DCP/MUXi is an intelligent multi-port board which allows a single PC-AT using an OS/2 operating system to support multiple tasks without degrading system performance. A normally equipped PC running under a multi-user operating system cannot handle more than 3 serial ports efficiently. This occurs because the overhead associated with handling character I/O reduces processing power left to handle application programs. The DCP/MUXi handles the character I/O itself allowing the host processor to handle the real time communication, control, display, and other application programs. The DCP/MUXi using at least a 286 or 386 processor is selected with 512 k or more of dual ported/dual access shared memory to store I/O routines. The synchronous ports allow connection to mainframe SCADA computers via an SNA, BISYNC, or X.25 connection. Ports configured for asynchronous operation can be connected to any RS-232C device, such as, another PC, a modem, or a dumb ASCII terminal. The DCP/MUXi supports an aggregate throughput of 15,000 characters/sec. for all serial ports. The synchronous ports can be individually configured as either DTE or DCE. When the synchronous ports are used, the corresponding clocks are set for DTE (incoming clocks). The DCP/MUXi to PC interrupt level is set along with the transparent mode interrupt level and the memory parity error reporting is enabled.

Three control registers are used by the host PC to control the CPU on the DCP/MUXi, depending on the switch settings. The control register settings must match the address configured in the software and not conflict with any other installed device. More than one DCP/MUXi can be used in an OS/2 environment, but each must have a separate address for control register 1. The number of DCP/MUXi boards that can be installed is limited by the support software, available back plane slots, and system power supply.

External interrupts from the serial ports normally come into the DCP/MUXi and are vectored automatically. The DCP/MUXi contains an Intel programmable timer/counter device which acts as a source for interrupts and timeouts. The DCP/MUXi has an Interrupt Mask Register, which allows the local 286/386 processor to mask individual interrupts, from the timers and host processor. The DCP/MUXi contains memory that is shared by the host. The host software is used to select the size of the window that is shared. The VCC uses a 512 k window size. The DCP/MUXi is installed in a 16 bit slot of the PC-AT.

The DCP/MUXi card in this VCC invention is connected via a specially developed card to an eight serial port distribution interface for external I/O connections. Since the VCC is to be used in an environment that requires protection of each I/O port from electromagnetic transients, switching surges, etc. the interface card serial ports fanning out of the DCP/MUXi are connected to transient and switching surge protection circuitry mounted on a printed circuit card and in-line with each RS-232 serial port mounted on the chassis. This allows up to eight external serial devices to be connected to the VCC with as many as six being asynchronous. The serial ports on the VCC are configured as Data Terminal Equipment ("DTE") ports for direct connection to modems or any other Data Communications Equipment ("DCE"). If the VCC has to be connected to a DTE device a null-modem connector must be used. Shielded cables are used to the external devices to reduce radio frequency interference ("RFI").

The DCP/MUXi board is configured for an OS/2 operating system. A software distribution diskette is used to install all the files necessary for installation of the driver. The VCC is booted up normally as a PC-AT and login as root. The distribution diskette is inserted in drive A. The files are copied onto the hard drive with at least 80 MB of memory. At least 4 MB of RAM is required for the OS/2 operating system. Installation command scripts are used for the configuration files. In assigning a device number to the DCP/MUXi in response to the command script the number of DCP/MUXi boards installed in the VCC must be entered. In order to go beyond the number of ports allowed by a given DCP/MUXi, additional Emulex DCP/MUXi cards may have to be installed. For each board in the VCC both the DCP/MUXi control register address and shared memory address must be entered. These are initially set via switches for each board. For the DCP/MUXi the shared memory address is set by the driver. Attributes can be assigned to the VCC serial ports, such as data rates through a particular port. The DCP/MUXi down load code is used to install a desired communications protocol. The whole process of installing the "kernel" software can be automated. A particular protocol conversion process, e.g. X.25 is made available repetitively to several devices attached to the VCC ports each using a different protocol in a multi-user environment.

This hardware configuration allows use of software diagnostics after the Emulex diagnostic monitor has been configured and loaded. Internal loopback tests can be conducted for all the serial ports. The RS-232C modem controls provide carrier monitoring via the Digital Carrier Device ("DCD") input signal. Loss of DCD signal generates a hangup signal to all attached processes and input characters will be ignored. Modem controls also provide hardware flow control utilizing RTS/CTS handshaking, if desired. When a port wishes to transmit, it asserts RTS. Transmission does not begin until CTS goes true. When transmission is complete, CTS is dropped. Modem controls are normally enabled but may be disabled by setting a particular flag bit.

All input conversions occur at the foreground level on the DCP/MUXi. To minimize internal interrupt latency and potential of input overruns or lost data, care must be taken in implementing system flags. All output conversions occur in the background level on the DCP/MUXi. Terminal input takes priority over output. If terminal input saturates the DCP/MUXi, a priority sequence can be assigned to the ports of the VCC.

The Emulex DCP/MUXi board is used to communicate with the voice digitizer board over an RS-232C serial port to transfer digitized voice data.

VCC Construction

The VCC uses a chassis with a passive backplane, Intel 80386 type processor, DC power supply, hard disk drive, floppy disk drive, ventilation system, keyboard, monitor, external controls, status alarms, port distribution cards, switching surge protection cards, and RS-232 ports for external device connection. The VCC chassis is an industrial enclosure that can be mounted in a 19-inch rack, if desired. Typically in a substation a 19-inch aluminum rack is used. For example a Dracon center mount, double sided tray can be used. The VCC slides between the channel uprights and is fastened to the face of each vertical channel upright with an angle bracket. The VCC is made up of a multi-slot passive backplane. For substation applications a 48 V DC power supply is used for the VCC to allow communication and substation control even when AC power is unavailable. The power supply and the RS-232 ports have an SWC rating that meets the IEEE C37.90.1-1989 specification. An air flow sensor is used to indicate presence or absence of forced air movement.

The VCC has a minimum 80 MB IDE hard disk drive. The system and applications software are stored on the hard disk drive which is only used during start up, unless event driven or other on-line diagnostic information is to be stored. The VCC is dustproof and is fitted with a hinged dust cover over the floppy drive. The 3.5 inch, 1.4 MB or better floppy disk drive is used for loading or archiving system/applications software.

The VCC internal electronics is cooled using positive pressure fan cooling. The air is forced into the chassis through a filter and directed across the expansion bus slots to cool the CPU board, Emulex DCP/MUXi, TSP Voice Digitizer and power supply electronics. The VCC is initially configured through an external 101-key enhanced keyboard. It is only needed during operational updates or configuration changes. Otherwise it is locked away in a closed drawer.

The VCC connects to an external VGA monitor which is rack-mounted. External controls include a power switch and a reset switch. The power switch is used for powering up/down the VCC system, and the reset switch provides warm reboot capability.

The VCC cover door is latched to allow positive ventilation. An internal speaker provides audible-only alarm indications. The DC power supply connector is a male connector on the VCC chassis.

Voice Digitizer

The VCC utilizes a Time and Space Processing(TSP) PC-AT Voice Digitizer board in an expansion slot of the PC-AT bus. A voice digitizer phone provides an interface with the voice digitizer card in the VCC, which in turn is connected to the DCP/MUXi through an RS-232C port. The analog voice input to the handset connected to the VCC voice port is digitized and encoded by the VCC voice compression card as shown in FIG. 2.

The key board connector on the VCC system is a standard 15-pin female DIN connector. It is used to connect the external keyboard to the host CPU.

The VGA monitor connector on the VCC is a 15-pin, female high density D-subminiature connector. It connects the external VGA monitor to the VCC VGA controller. The VCC has port designations for the Voice Digitizer and other asynchronous RTU ports, including the Ports having synchronous capability.

The VCC is constructed to meet the temperature, humidity, switching surge, transient, electro-static discharge, altitude, particulates, shock and vibration requirements for substation equipment. The relative humidity conditions the VCC meets is between 0–90% non-condensing.

To survive the electrical environment of a substation the VCC is designed to withstand the oscillatory SWC test wave of frequency range 1.0 MHz to 1.5 MHz, voltage range of 2.5 kV to 3.0 kV crest value of first peak, envelope decaying to 50% of the crest value of the first peak in not less than 6 micro-seconds from the start of the wave.

The fast transient waveshape to be applied to the VCC for the test is a unidirectional wave. Its rise time from 10 to 90% shall be no greater than 10 nano-seconds. The crest duration above 90% shall be at least 50 nanoseconds. The decay time from crest to 50% of crest value shall be 150 nano-seconds±50 nanoseconds. The crest voltage is between 4 kV and 5 kv, open circuit.

The VCC incorporates industry standard ESD protection in assembly and installation of the internal printed circuit boards.

The VCC is designed to effectively operate in a dusty/dirty substation environment.

The Voice Digitizer card is connected to the external phone through a 15-pin female D-subminiature connector. The cable assembly and buzz-down phone is supplied by TSP. The second connector on the PC-AT Voice Digitizer is the RS-232 serial port interface connector. This connector is a 9-pin male D-subminiature and is used with the PC-AT Voice Digitizer RS-232 Null-Modem cable assembly to interface the Emulex DCP/MUXi front end processor. The external phone interface connector mates with the Surge Withstand Capability ("SWC") Circuit card on all applicable lines. The SWC rating meets the IEEE C37.90.1-1989 specification.

PC-AT Voice Digitizer Board

The Voice Digitizer Printed Circuit Board ("PCB") is inserted in the expansion slot of the PC-AT processor bus to provide voice communications simultaneously with SCADA traffic through the DCP/MUXi. Power to the PCB is supplied through a 62 finger connector to the PC-AT bus. The analog voice signals are routed through a DB-9 connector to the four wire telephone and connections made to provide on-hook/off-hook signals in the manner of a regular telephone. A third DB-25 connector and ribbon cable provides an RS-232C serial interface to the DCP/MUXi. A push button in the middle of the handset is depressed in the manner of a radio telephone, and when released after the speaker is done, alerts the receiver at the other end to respond.

To accommodate the delay in signal transmission through a satellite, a process is implemented to provide a tone at the receiving end when the speaker is finished talking.

There are four basic functions provided by the PC-AT Voice Digitizer PCB:

1. Voice and signalling interface designed to accommodate the 4 wire TSP telephone or equivalent. Through this interface analog voice signals, on-hook/off-hook signals, and DC power are conveyed between the phone and Voice Digitizer PCB.

2. Digital Speech Processing models the input analog voice signals and converts them to a digital data stream at selectable discrete rates of 3.6 kbps, 4.8 kbps, or 9.6 kbps depending on available bandwidth. This data stream is transmitted to the remote site. An incoming compressed digital voice data stream is synthesized from the remote voice digitizer, using a D/A model to convert back to analog voice to drive the local handset receiver.

3. The digital voice I/O and RS-232C control signals are routed to the VCC via a serial interface.

4. Power is supplied to the PC-AT via the PC-bus connector.

The standard compressed voice software, for example used by the TSP series 5800, has been modified for use in the VCC and to provide it with information on the operational status of the voice digitizer and most important to preserve satellite bandwidth, if the VCC is communicating with other VCC's over a satellite network.

The VCC uses the following control signal protocol with the Voice Digitizer PCB. The Voice Digitizer recognizes the off-hook status and raises "DTR" while suppressing any data output. The VCC acknowledges the call attempt by raising DTR. The PC-AT Voice Digitizer generates a "Dial Tone" to the caller, when the VCC raises DTR. If the VCC does not acknowledge the call attempt by raising "DTR" the PC-AT Voice Digitizer PCB generates silence to the caller. The caller dials the number and the digitizer collects the digits. After six or fourteen digits followed by a ten second timeout, the Voice Digitizer passes the digits to the VCC as a string of ASCII characters. The Voice Digitizer then waits for an indication from the VCC indicating the connection has been established. This indication is in the form of an ASCII character string "com" sent to the Voice Digitizer by the VCC. When a "call connection" is received, the calling Voice Digitizer generates a ringing tone. It then sends digitized voice to the connected VCC after detecting the remote off-hook condition. During the call, the silence suppression state is indicated by the PC-AT Voice Digitizer by dropping "RTS" to the VCC, indicating the currently buffered data is to be sent immediately without waiting for the current block to be filled. Subsequently, the Voice Digitizer PCB indicates arrival of voice data to the VCC by raising "RTS". The VCC terminates a call to the Voice Digitizer by dropping "DTR". The PC-AT Voice Digitizer PCB card indicates call termination by dropping "DTR".

For an incoming call the following control signal protocol is used: The VCC will raise "DTR" causing the Voice Digitizer to indicate an off-hook at the calling end and generating a ringing tone. When the called party's phone goes off-hook the PC-AT Voice Digitizer raises "DTR" allowing voice communications to begin. Silence suppression is indicated by raising or dropping "RTS".

Call progress tones such as, ringing, busy, dial and reorder, are not passed on to the VCC for transmittal in-order to save satellite bandwidth. Instead, a signalling frame is generated by the local VCC causing the receiving end VCC Voice Digitizer PC-AT to generate the appropriate call progress tone, or is generated internally depending on the state of the call.

VCC Architecture at RTU (FIG. 3)

FIG. 3 shows the manner in which the same VCC hardware is configured for deployment at a number of RTU sites, for example with a CDC Type 1 protocol, L&N protocol, or Opto-22 protocol. All sites are also assumed to have a compressed voice requirement for emergency communications, shown as a TSP Voice Digitizer Phone. The SWC surge protection circuitry is designed to protect each RS-232C DCP/MUXi input terminal connection. The Input/Output process interfaces with the VSAT Controller using an X.25 I/O process interface protocol and is physically connected through a Surge Withstand Capability PCB. The substation RTU is similarly connected through a SWC PCB to the Emulex Communication Processor Board RS-232C interface. The DCP/MUXi processor handles the special needs associated with simultaneous digital voice, remote monitoring and control. Since the system has been developed for a multi-tasking environment using OS/2, the various I/O processes shown in FIG. 3 can occur simultaneously. Through a Data Queue Process and Dual-port Memory that is shared by both the VCC host computer and the CPU on the Emulex Communication Processor Board, the various tasks, including the Database Transfer Process and Digitized Voice Switching Process can go on in parallel. The Synthetic Master Process emulates the SCADA Master in code and appears to the RTU as if it were co-located. While the I/O ports are physical ports the dual- ported memory ports shown are logical (virtual) ports. The Synthetic Master Process through the Data Queue Process, and the Dual Port Memory which acts as buffers accessed through interrupts under program control, establishes the RTU Database through the RTU Database Transfer Process Reader.

At regular intervals the Synthetic Master Process sends a poll to the RTU to ask for data. The data from the RTU passes through I/O Process Protocol: CDC type 1. The process decodes the serial data into storable data. The decoded data is sent through the Data Queue Process and the Dual Port Memory acting as buffers. The data then passes through the Synthetic Master Process which enters the data into the RTU database and sets a flag. This flag alerts the Database Transfer Process (Reader) indicating that there is new information waiting in the RTU Database for it. The Reader than picks up the data and reformats it into a form required by the X.25 protocol. It then goes back through the buffer zones to the I/O Process Protocol: X.25 which tags it with a Logical Channel Number. The data then goes to the VSAT Controller where it is reformatted for transmission over the satellite.

VCC at RCC (FIG. 4)

FIG. 4 shows the VCC at a Regional Control Center ("RCC") site. The RCC can gain access to the individual remote RTU Databases through the Synthetic RTU Process emulation. Regardless of the protocol used by the Remote RTU's the VCC I/O Process Protocol converts the RTU Database to the required RCC SCADA Master protocol.

At the RCC site, the data comes from the satellite through the VSAT Controller to the I/O Process (Protocol: X.25) which tags the data with the proper address. The data goes through the Data Queue Process into Dual Port Memory and into the corresponding Data Transfer Process (Writer). There it is broken from X.25 into a format suitable for the RTU Database. The data then goes to the RTU Database and sets a Timer. The RCC sends polls at regular intervals requesting current data from the Synthetic RTU Process. The Synthetic RTU Process then goes to the RTU Database and retrieves the data. If the data time elapsed in the RTU Database is less than the maximum specified, then the data goes through the communications Processor to the RCC.

If the satellite network uses a Spread Spectrum Multiple Access technique, encoded data allows simultaneous transmission of messages through VSAT Controllers at several stations on a "private channel" to the hub satellite earth station. Data or control signals from the hub station to the remote VSATs are on a party line. The VSAT Controller looks for the proper link address in all the messages going by to get its own traffic. Messages going out of the VSAT Controller's space processor have a "network header" in front. These headers contain information on message length and other administrative data. Each message also carries a trailer which contains additional Forward Error Correction bits. The I/O process places a header on the message and also embeds a X.25 message.

Communication Between TRU and RCC

As shown in FIGS. 3 and 4 each VSAT Controller has an assigned link number. A satellite network operator can assign a link number to the VSAT Controller over the satellite by sending a message which includes the link number (LCN) and serial number of the VSAT Controller. The X.25 address has 3 parts: Link number, physical port number on the VSAT, and the subaddress. During setup of a X.25 connection between two VSAT's the program uses the entire 8 byte address. During the connection process, the two ends select a one byte Logical Channel Number (LCN). This LCN is a data tag used in the accurate delivery of data packets. This results in a virtual channel on a shared communications channel.

The logical ports enable communications within the VCC between the VCC Host Computer processes and the Emulex Communication Processor Board I/O processes. For example, the process which handles the telephone traffic communicates with the telephone via one port and communicates with the X.25 network through another port. The I/O process, which handles the X.25, uses several ports to communicate with corresponding host processes, FIG. 4.

The Data Queue Process is used to write data into buffers at required times. When the Reader is ready, data is removed on a First-In-First-Out (FIFO) basis. The I/O processes and Dual Port Memory use queues between them. The Synthetic RTU Process and the Database Transfer Process (Writer) also use queues between them to move data out to the RTU. These queues are used during Select-Before-Operate commands.

Since the VCC uses an Industrial PC-AT this invention allows emulation of the RTU function and a screen driver with two display modes. The first mode displays the raw data between the VCC and a RTU or between a VCC and an RCC. It also shows X.25 data interspersed with data destined for the RTU Database. The second mode provides a formatted display of the data in the RTU Database. This allows a check of the communications between the VCC and the attached RTU or RCC (depending on whether the VCC is located at a RTU or RCC site). It also allows a check to ensure data is flowing between the local VCC and the remote VCC.

System Overview

The VCC communicates to local and remote asynchronous and synchronous serial devices. Standard devices include the Very Small ApeRTUre Terminal (VSAT) and a TSP Voice Digitizer (used for voice communications). Each VCC is capable of supporting up to six additional serial devices (one synchronous and five asynchronous devices). With a second DCP/MUXi card, the number of physical ports can be doubled. The VCC can also be configured to handle multiple RTU's per physical port. If the RTU's are small with infrequent scan requirements, hundreds of devices can communicate with each physical port. These additional ports are available for communication to a wide range of serial equipment, the majority of which are RTU's.

The remote capabilities of the VCC afford it the ability to communicate with devices that are connected via a satellite, terrestrial, or hybrid networks. In this manner the VCC can establish a Switched Virtual Circuit (SVC) to another VCC on the network. Programs running on the VCC can then read incoming network data and translate this information, depending on the target device, to the appropriate protocol. This information can then be forwarded to the serial device for interpretation.

Figure 5:
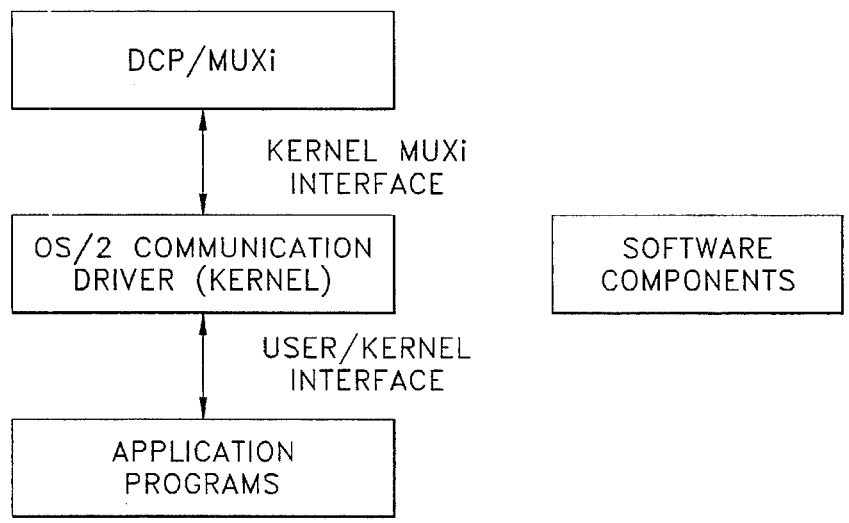
FIG. 5 is a flow diagram of the OS/2 Multi-Tasking VCC System Architecture.

OS/2APs Overview (FIGS. 5 and 6)

FIGS. 5 and 6 identify three software components of the VCC system.

The first, the DCP/MUXi, is the download code that physically runs on the DCP/MUXi serial communications board. The second, the OS/2 Communication Driver, is the kernel level component that provides a means for application programs to communicate with the DCP/MUXi. And finally, the OS/2APs, is a conglomerate of application programs that provide the system with data retrieval capabilities, data forwarding capabilities, and data monitoring capabilities. In addition, the OS/2APs provide a man/machine interface that supports operations on equipment, such as the select-before-operate ("SBO") function found on RTU devices.

In general, the OS/2APs communicate with one another (inter-process communication) via the RTU Database. This Database is located in a shared memory segment and provides a semaphore control scheme for multi-process access. Access to each Database is limited to one active writer and up to eight active readers. Data is deposited into the Database for later retrieval by another process.

The OS/2APs also communicate to the physical devices attached to the VCC. This functionality is implemented using a queue scheme. The queue is a linked list of 512 byte buffers that is read via the MUXi Communication Driver. Thus if an Application program wishes to send information to the MUXi Communication Driver, it will allocate a buffer and place this information on the queue.

Software

The role of each software component is discussed below:

CENTRAL.EXE is the start-up and configuration program. Its functions include setting up database shared memory segments, allocating the appropriate semaphores for database access control, setting up the buffer areas shared memory segments, allocating the appropriate semaphores for buffer area access control, and finally, starting up processes as defined in its configuration file central.cfg.

Figure 7:
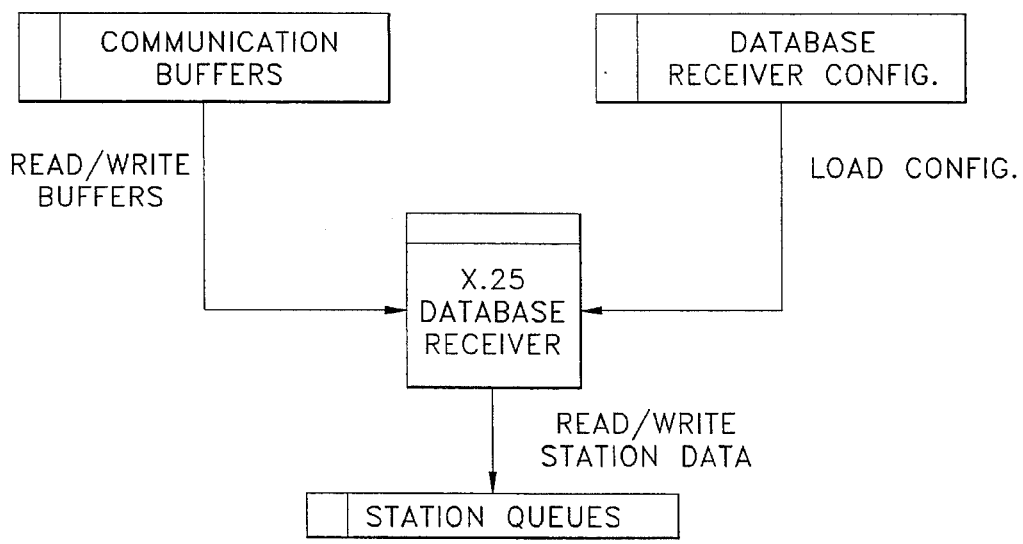
FIG. 7 shows the data base receiver process.

X25_DBR.EXE (database receiver)—FIG. 7 is responsible for receiving data from the appropriate X.25 Switched Virtual Circuit (SVC). This process, on startup, obtains configuration information from a file located in the designated configuration directory. The X25_DBR process then proceeds to open a communications channel with the DCP/MUXi Down Load Code via the MUXi Communication Driver. On completion, the X25_DBR process opens the buffer area, starts a polling thread, and then opens the RTU Database for writing. If X25_DBR is successful in establishing a connection to the Database, the process then starts receiving data from the established SVC.

X25_DBX.EXE (database transmitter) is responsible for sending data to the appropriate remote database via a X.25 Switched Virtual Circuit (SVC). This process, on start-up, obtains configuration information from a file located in the designated configuration directory. The X25_DBX process then proceeds to open a communication channel with the DCP/MUXi download code via the MUXi Communication Driver. On completion, the X25_DBR process opens the buffer area, starts a polling thread, and then opens the RTU Database for writing. If X25_DBX is successful in establishing a connection to the Database, the process then sends data, via the established SVC, to the remote host.

O22_SM.EXE (opto-22 Synthetic master) is responsible for reading and writing information to and from an attached RTU running the Opto-22 protocol. This process, on startup, obtains configuration information from a file located in the designated configuration directory. The O22_SM.EXE process first opens a communication channel with the appropriate logical port. On completion, the O22_SM.EXE process opens the buffer area, opens the appropriate RTU Database for writing, and then starts a polling thread. The main processing loop of the O22_SM.EXE process checks for incoming data in the appropriate queue (such data includes SBO or status request commands from a remote master), services the remote requests with aged data obtained from the RTU Database, and periodically polls the attached devices to update data stored in the RTU Database.

CDC_SM.EXE (CDC Synthetic master) is responsible for reading and writing information to and from an attached RTU running the CDC 44-500 type 1 protocol. This process, on start-up, obtains configuration information from a file located the designated configuration directory. The CDC_SM.EXE process first opens a communication channel with the appropriate logical port. On completion the CDC_SM.EXE process opens the buffer area, opens the appropriate RTU Database for writing and then starts a polling thread. The main processing loop of the CDC_SM.EXE process checks for incoming data in the appropriate queue (such data includes SOB or status request commands from a remote master), services the remote requests with aged data obtained from the RTU Database, and periodically polls the attached devices to update data stored in the RTU Database.

CDC_SR.EXE (Opto-22 Synthetic reader) process is used to read data from a local RTU and store that information into the RTU Database.

TSP_DIAL.EXE process is used to dial other nodes on the network.

The specific role of each of the OS/2AP's software modules is summarized below:

| Item | File Name | Summary of Role |
|---|---|---|
| 1 | CENTRAL.EXE | Allocate Shared memory and start-up all remaining processes |
| 2 | X25_DBR.EXE | Poll for incoming packets place them in the appropriate RTU database |
| 3 | X25_DBX.EXE | Transmit data packets to remote hosts |
| 4 | RMU_EMU.EXE | Allow for man/machine interface to VCC |
| 5 | O22_SM.EXE | Poll RTU for requested information, simulates the O22 Protocol |
| 6 | CDC_SM.EXE | poll RTU for requested information, simulates the CDC Protocol |
| 7 | CDC_SR.EXE | Polls colocated RTU to obtain required information/confirm control action |
| 8 | TSP_DIAL.EXE | Dial a remote site over a X.25 SVC |

Figure 6A:
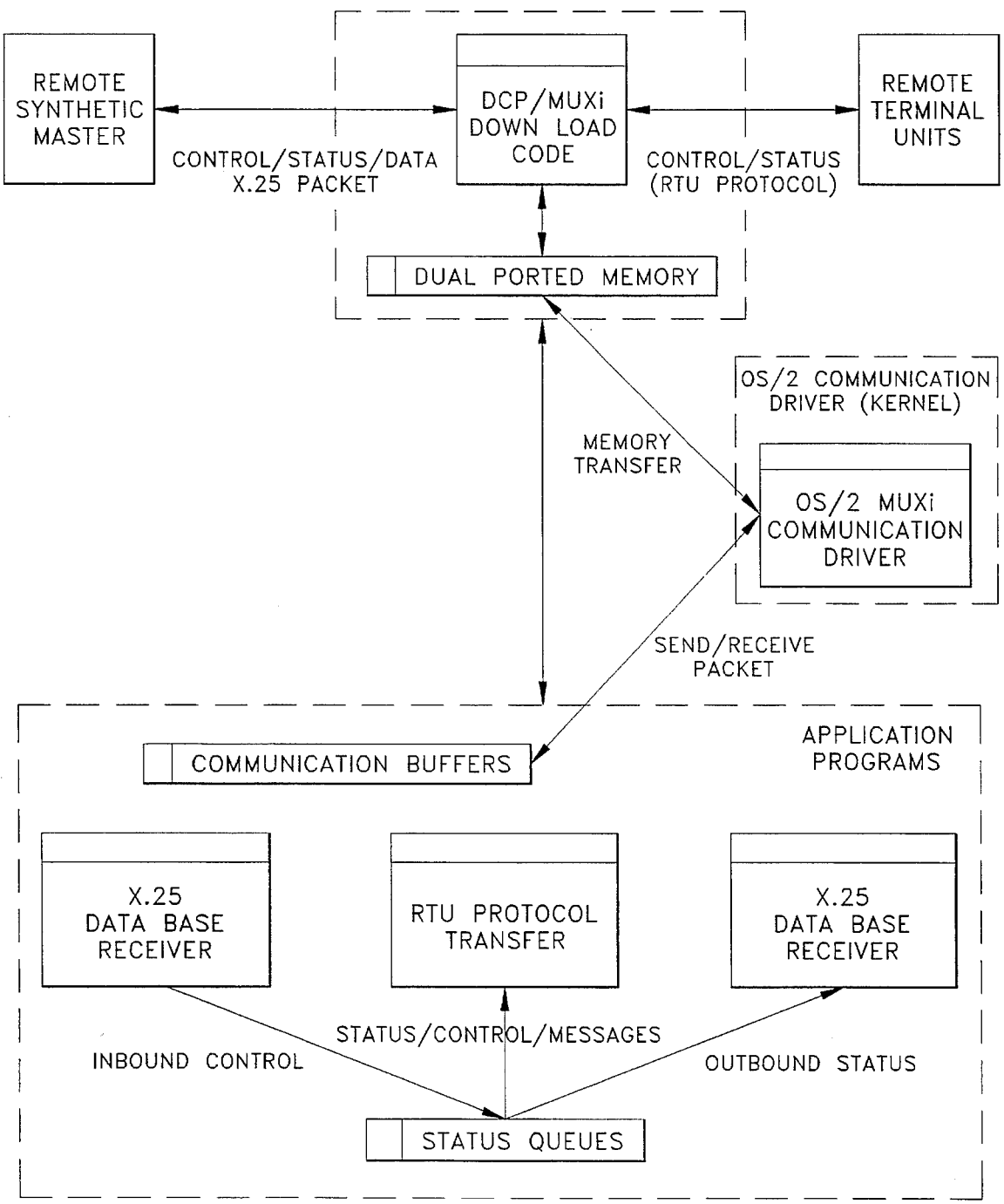
FIGS. 6A and 6B show the data flow for the VCC software components interface diagram.

The general operation of the OS/2AP' and the rest of the system can be best summarized in the data flow diagram shown in FIG. 6A. This figure shows the data flow between the various subsystems.

Figure 6B:
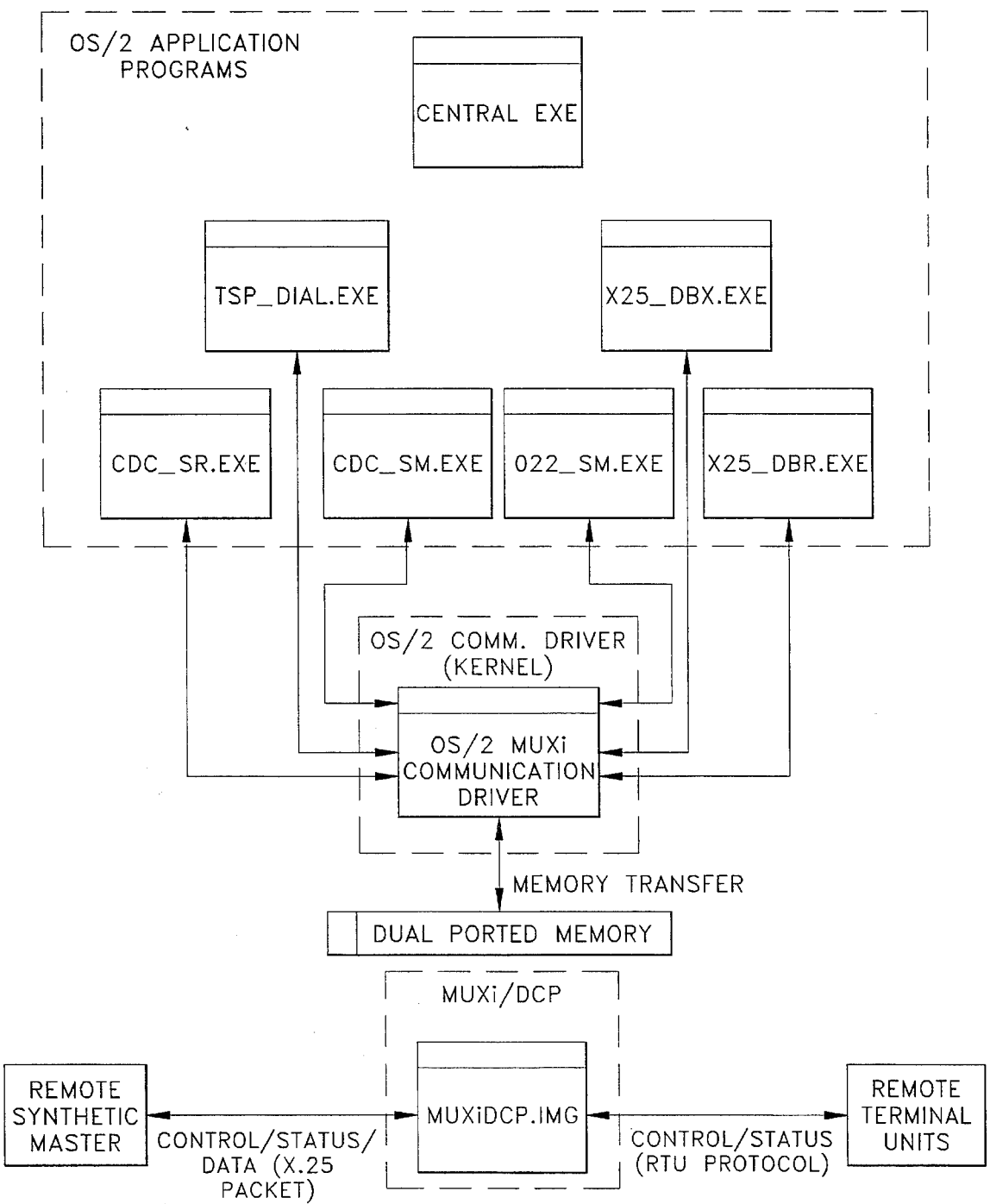

FIG. 6B diagrams the process than run on the VCC. Although FIG. 6B shows seven processes running, this may or may not be the case and depends on the devices attached. This issue is best illustrated through example. The Central.Exe program is used to start up all of the appropriate processes described in its configuration file. The entries in this file contain the protocol conversion routines used to translate traffic coming from the X.25 network in the correct protocol for the attached equipment. Thus, if a VCC only had Opto-22 RTU equipment attached, its configuration file would contain the following entries: An entry for 022-Sm.Exe, used for translating network traffic into Opto-22 protocol message; an entry for X25DBX.Exe, used to transmit status information from the 022-Sm.Exe process over the X25 network; an entry for the X25DBR.Exe, used to receive traffic from the X25 network and finally, if the remote site was to support voice communications the program Tsp-Dial.Exe would be started to grant the attached telephone access to the X25 network.

Figure 8:
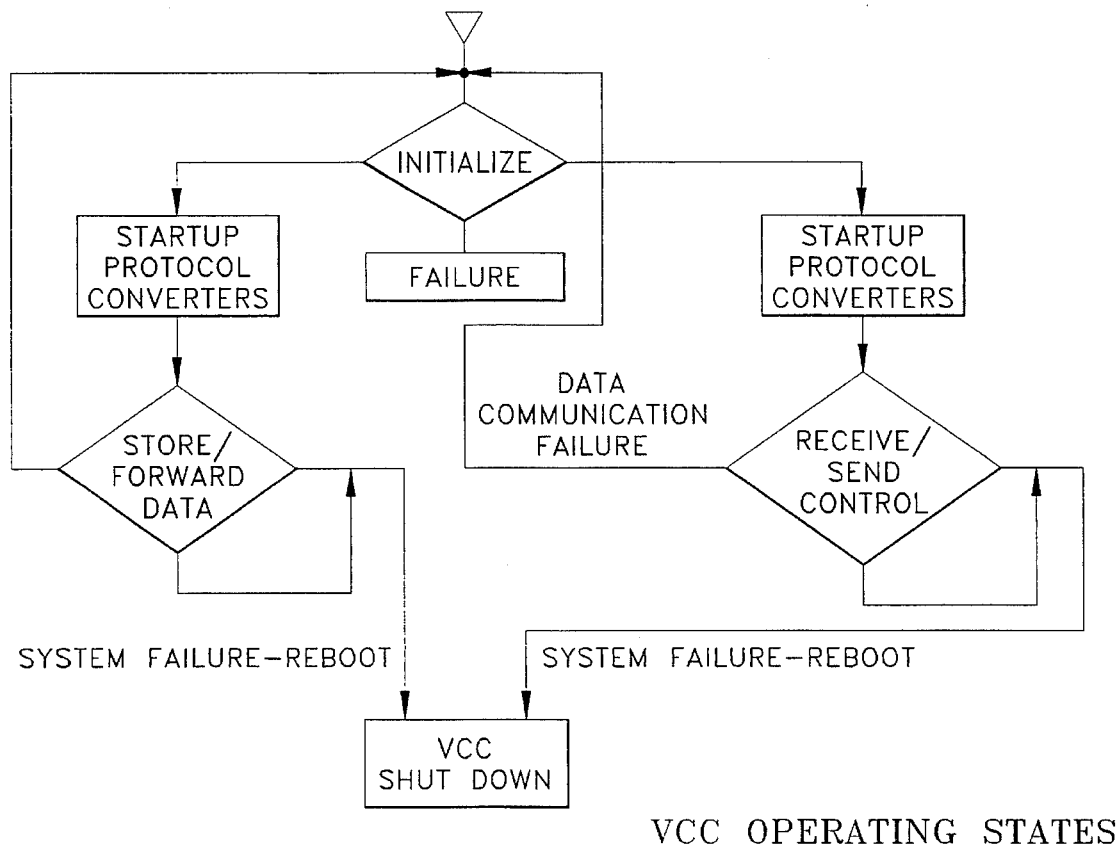
FIG. 8 shows the VCC operating states.

System States and Modes (FIG. 8)

FIG. 8 identifies states of operations for the OS/2APs. Application programs wishing access to the VCC environment are started by the Central.Exe process. This is depicted as the initialize state shown in FIG. 8. After completing initialization and starting the appropriate application protocol conversion programs the system enters into a two concurrent states depicted in FIG. 8.

If data communications failure is detected the protocol conversion programs will call a procedure to initiate a automatic reboot sequence.

Figure 9:
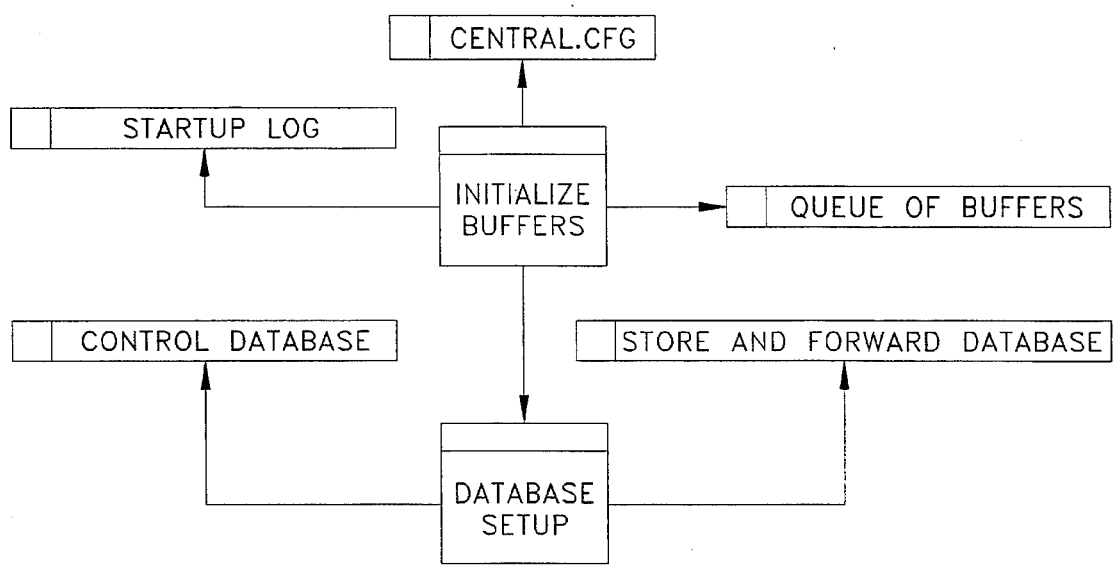
FIG. 9 shows the initialization data flow block diagram.

Software Design
Central.Exe (FIG. 9)

The Central.Exe program is used to allocate shared memory segments (databases) to each station defined in the central.cfg file. The Initialization Data Flow Block Diagram shown in FIG. 9 shows that on start-up central obtains information from Central.cfg. This information includes site name, RTU's defined at the site and the binaries that are necessary at this site for polling and monitoring data flow. Once this information has been processed Central.CFG then proceeds to create the buffer pool containing sixty four 512 byte buffers. This pool will be used by other OS/2AP's for temporary data storage and allocating buffers to be placed on the queue.

After the initialization of the buffer area is complete, Central.Exe then allocates the necessary shared memory segments for the RTU Databases.

There are two types of RTU Databases, Control and Station. The Control Database is used to maintain system wide data that needs to be accessible to all OS/2APs. This information includes the number of stations monitored at this VCC (a station is one serial line that can contain one or more RTU's), an array of station numbers, database reader count, database writer count, database monitor count, an array of process identifiers of each reader, an array of process identifiers of each writer, and some additional debug information. The Station database, on the other hand, is used to store RTU specific information, some of this information includes an array of analog data points, an array of status data and an array of pulse counter data. Station databases are allocated on a per station basis.

Once all the memory for the databases has been allocated Central.Exe then starts all of the protocol conversion processes as specified in the Central.Cfg. If start-up of these process is successful the programs then starts a timer thread and periodically polls the MUXi Communication Driver with an empty receive buffer to verify its status. If this operation fails Central will initiate an automatic reboot procedure.

Database Receiver Process (FIGS. 7 and 10 to 17)

Figure 10:
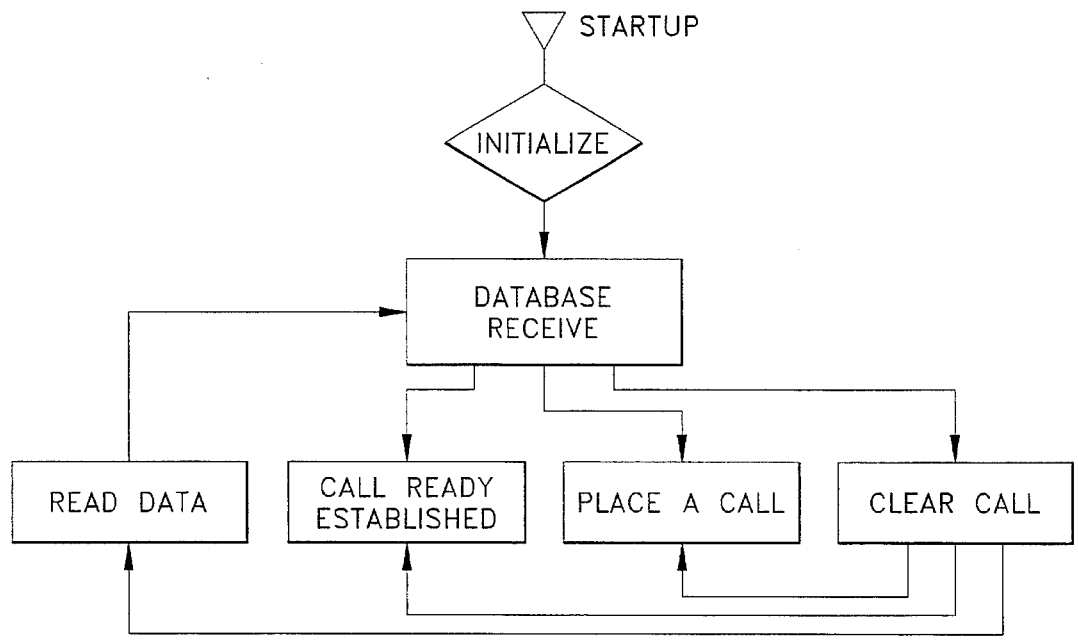
FIG. 10 shows the data flow for the database receiver process.

FIG. 10 shows the data flow for the Database receiver process of FIG. 7.

FIG. 7 shows the data flow diagram for the database X25_DBR.EXE receiver process.

X25-Dbx.Exe

Figure 11:
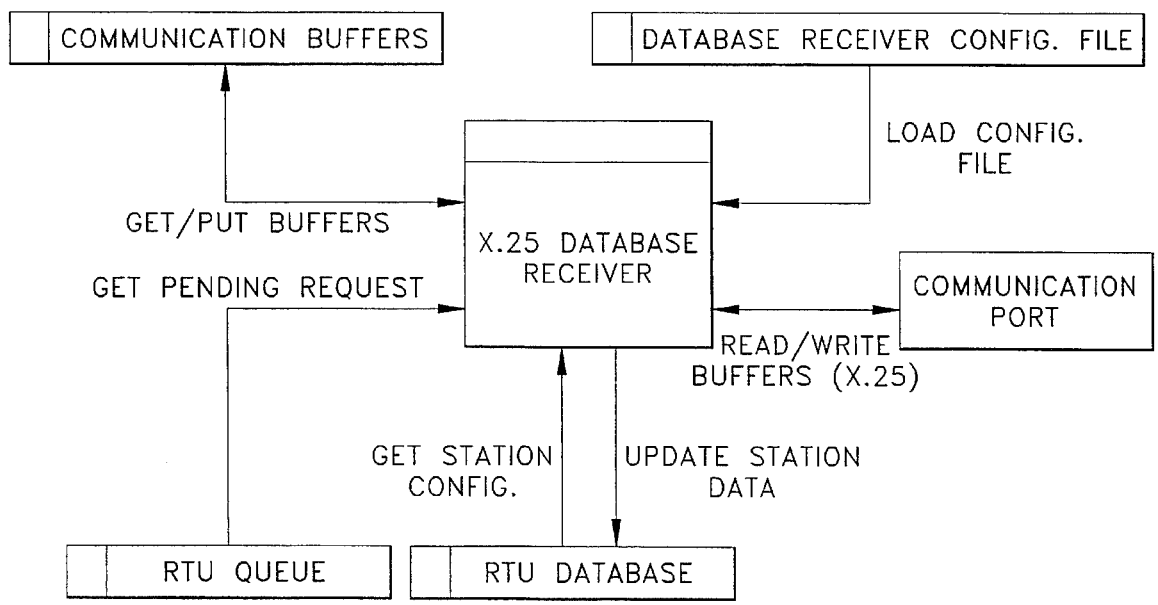
FIG. 11 shows the data flow for the database transmit process.

FIG. 11 shows the data flow for the database transmit process.

Rmu-Emu.Exe

Figure 12:
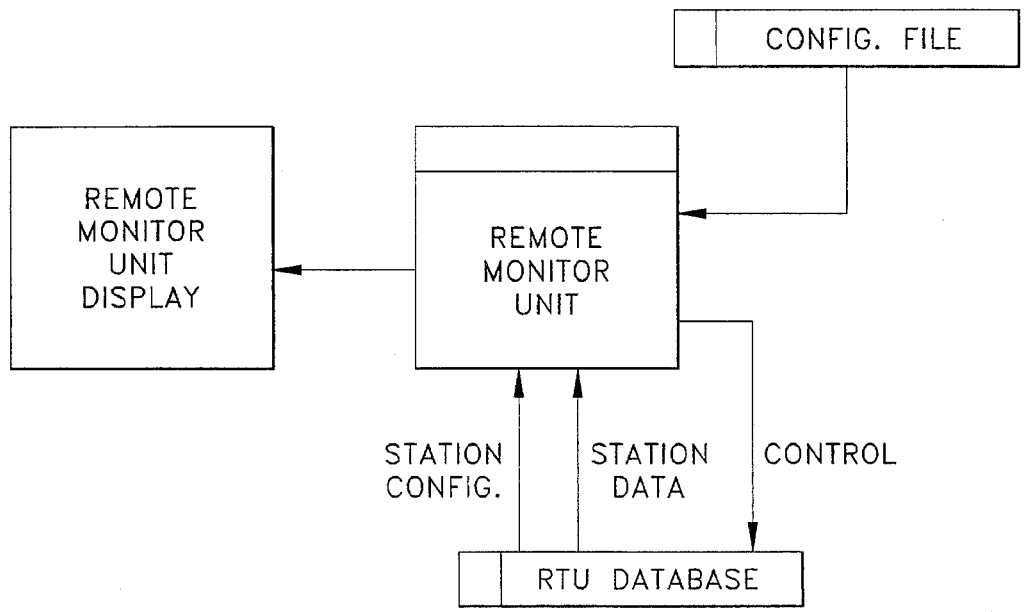
FIG. 12 shows the data flow for the RMU emulation process.

FIG. 12 shows the data flow for the RMU Emulation Process.

O22-Sm.Exe

Figure 13:
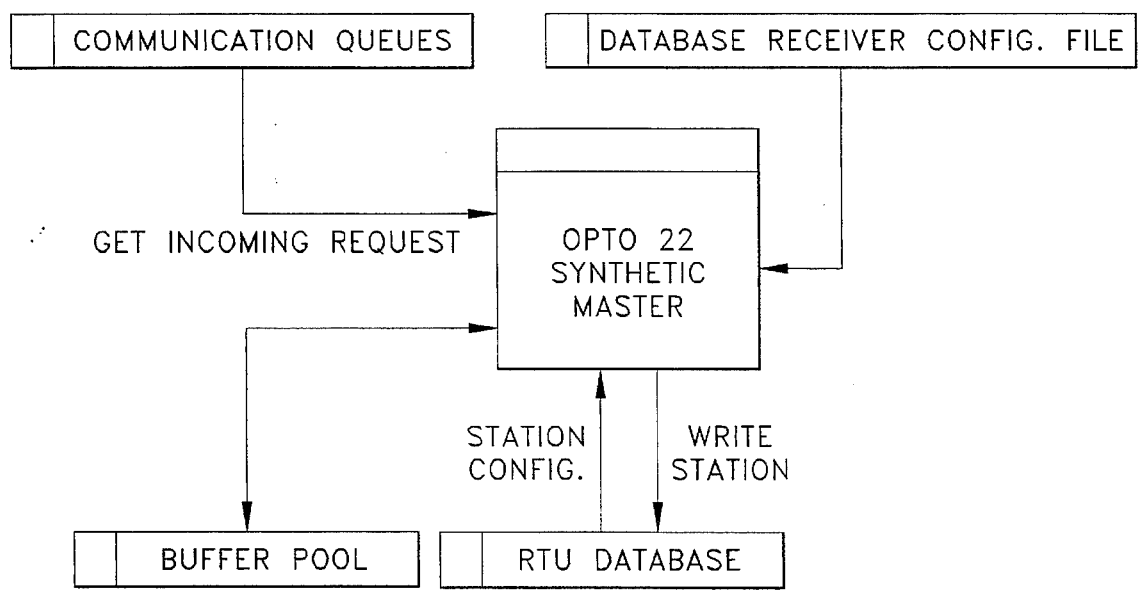
FIG. 13 shows the data flow for the Opto-22 synthetic master process.

FIG. 13 shows the Data Flow for the Opto-22 Synthetic Master Process.

Cdc-Sr.Exe

Figure 14:
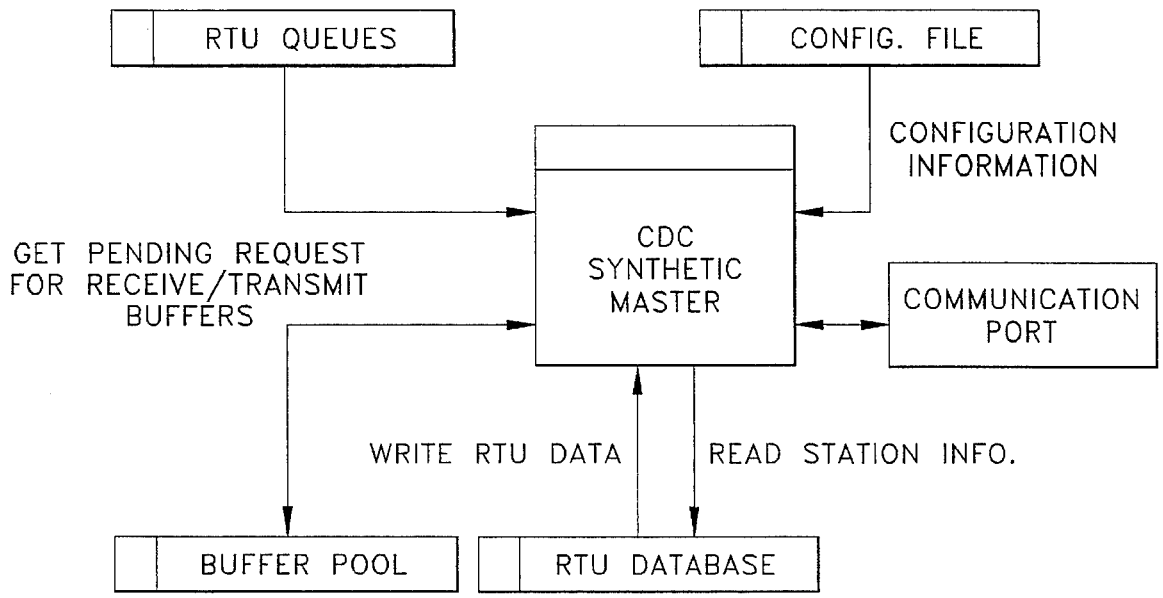
FIG. 14 shows the data flow for the CDC synthetic master process.

FIG. 14 shows the data flow for the CDC Synthetic Master process.

Figure 15:
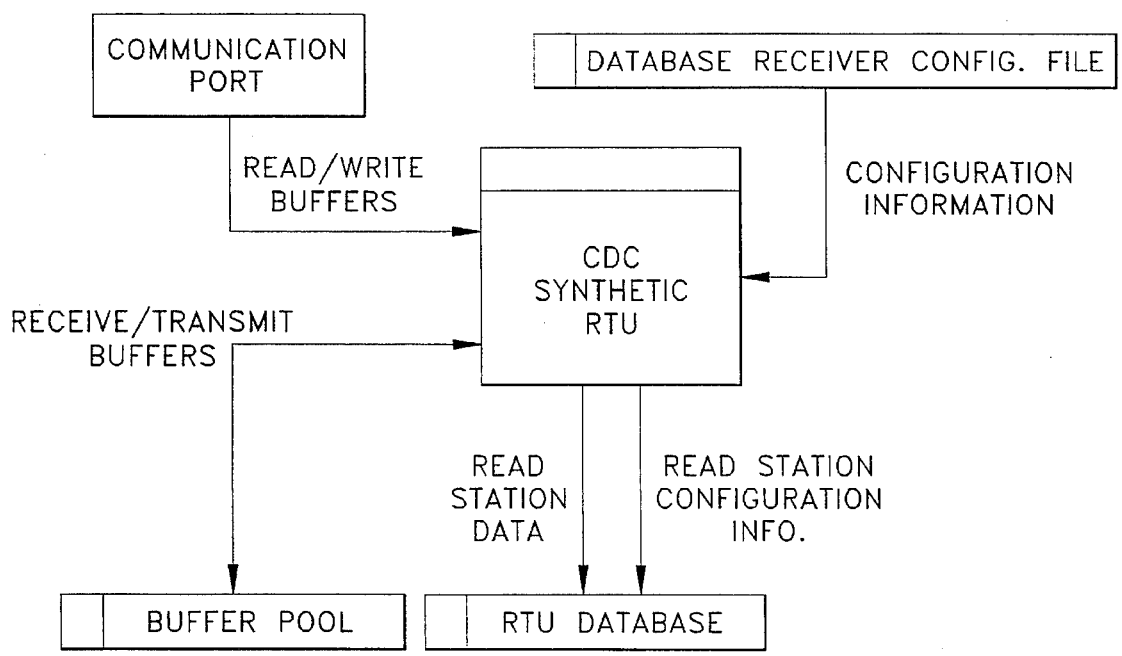
FIG. 15 shows the data flow for the CDC synthetic RTU process.

FIG. 15 shows the data flow for the CDC Synthetic RTU process.

Tsp-Dial.Exe

Figure 16:
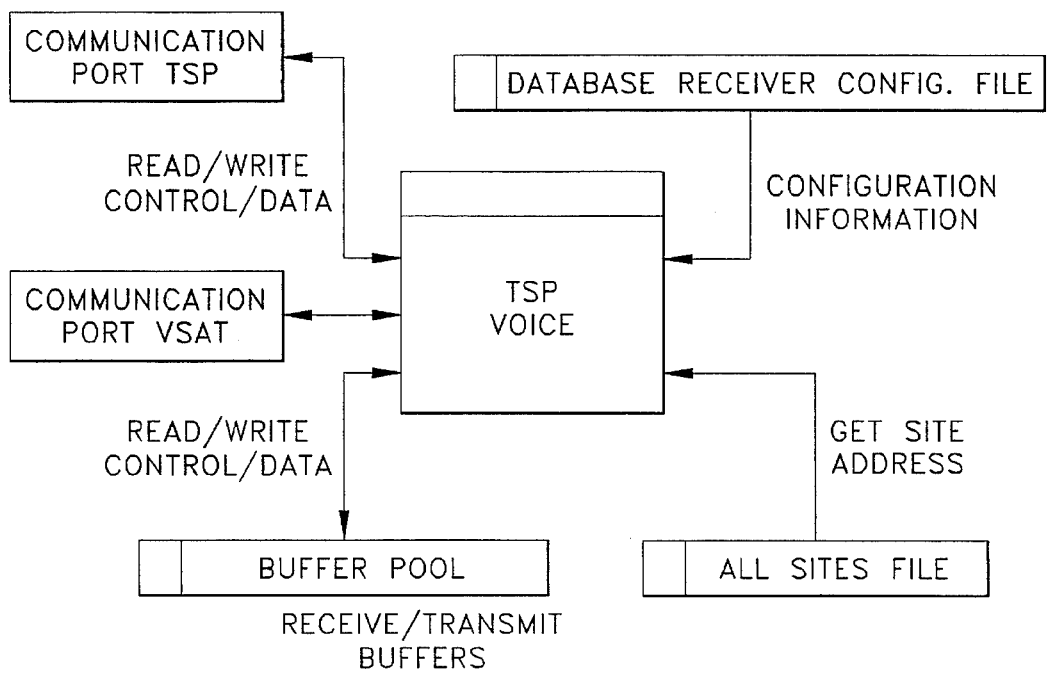
FIG. 16 shows the data flow for the TSP dial process.

FIG. 16 shows the data flow for the TSP Dial Process.

Central.Exe (FIG. 7)

Figure 17:
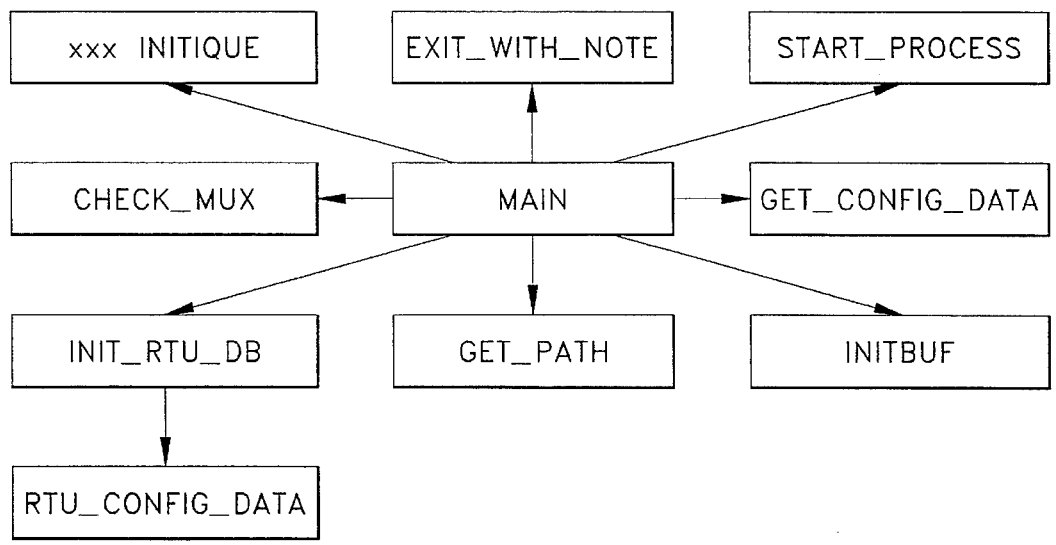
FIG. 17 shows the structure for the CENTRAL.EXE.

FIG. 17 shows the structure of Central.Exe.

Check-Mux

The check_mux routine is used to periodically check the DCP/MUXi Communications Driver board to insure that it is running.

Get-Config-Data

This function is used to open the configuration file and read in its contents. A unsuccessful read of this file will result in a return value of 1. This routine contains all of the configuration information that will be read into the system. It is therefore not a general purpose tool and must be modified prior to adding a new configuration item. Each configuration item is represented by a parameter string/value pair. The parameter string is the name of the parameter as it is found in the configuration file. The item(s) following the string is the value assigned to the parameter.

The type, elements involved and parameter strings defined for some key functions are shown to illustrate the configuration set up items for a VCC:

| Type | Element name | Parameter String |
| --- | --- | --- |
| char | site_list_file[16] | site list file |
| char | local_site_name[32] | local site name |
| char | remote_site_name[32]; | remote site name |
| USHORT | secondary_dual_port; | secondary dual port |
| USHORT | primary_dual_port; | primary dual port |
| USHORT | x25_address; | X.25 address |
| USHORT | vsat_cable); | VSAT cable |
| USHORT | terminal_unit_cable; | terminal unit cable |
| ULONG | msg_interval; | msg interval |
| ULONG | call_delay; | call delay |
| char | call_list_file[16] | call list file |
| USHORT | keep_alive_interval | keep alive interval |
| USHORT | keep_alive_time_outkeep_alive_time_out | |
| USHORT | timer_resolution | timer resolution |
| USHORT | cnfg_station_number [MAX_STATIONS] | RTU station number |
| USHORT | station_count | |
| UCHAR | RTU_address[MAX_STATIONS] | RTU addr vs station num |
| USHORT | RTU_poll_interval; | RTU poll interval |
| USHORT | max_rtu_data_age | max rtu data age |
| USHORT | baud_rate; | baud rate |
| USHORT | program_count | |
| USHORT | mux_debug_que_count; | max debug que count |
| USHORT | alarm_print_enable; | alarm print enable |
| USHORT | debug_mux; | debug mux |
| char | program_name[MAX_PROGRAMS] [64] | pgm, config and logdir |
| char | config_file_name[MAX_PROGRAMS] [64] | pgm, config and logdir |
| char | log_directory[MAX_PROGRAMS] [64] | pgm, config and logdir |
| char | program_title[MAX_PROGRAMS] [64] | pgm, config and logdir |
| char | customer_account_number[12] | customer account number |
| char | customer_passwd[12] | customer password |
| char | calling_address[16] | calling address |
| static | debug_cfg | debug cfg |
| USHORT | | |

Get_Path

The get_path function is used to obtain the location of the file. Its arguments include path and the file_name. Get_path returns a pointer to the file found or NULL if the file is not found.

Init-Rtu-db

This routine is used to create the control data base and defined by the structure control_rtu_struct. The control data base is used to contain information like the number of station databases on the system, the local site name, and debug queuing information. In addition to setting up the control database this routine also allocates a shared memory segment for each station. The station numbers are identified in the Central.cfg file by the argument RTU station number. Each station found in the configuration file will have a RTU database allocated for it. The data structure used for this database is rtu_data_struct. The important items to mention are that the init_rtu_db routine sets the variable send_to_RTU_que_number and send_to_MSTR_que_number to sets of the sequence (0,1),(2,3)(4,5) etc . . . It also assigns all the values found in the configuration files into the database.

Initbuf

The initbuf routine clears all memory, sets up the free list (addresses of buffers not in use) and set up a buffer chain.

Initque

This routine is used to initialize the que_data_struct. The VCC has 20 separate queues and this routine initializes each of the 20 queues to point to the first free buffer and sets the que_count to zero.

Rtu-Config-Data

This routine is used to initialize all of the variables in the RTU Database.

Start-Process

This routine is used to start up all processes specified in the Central.cfg file.

Main

In addition to calling all of the modules include Central sets up and initializes the buffer pool which is used by the remaining application programs to communicate with the MUXi OS/2 Communications Driver. The pool is maintained as a series of sixty four 512 byte buffers. These buffers can then be allocated to up to 20 separate queues.

Figure 18:
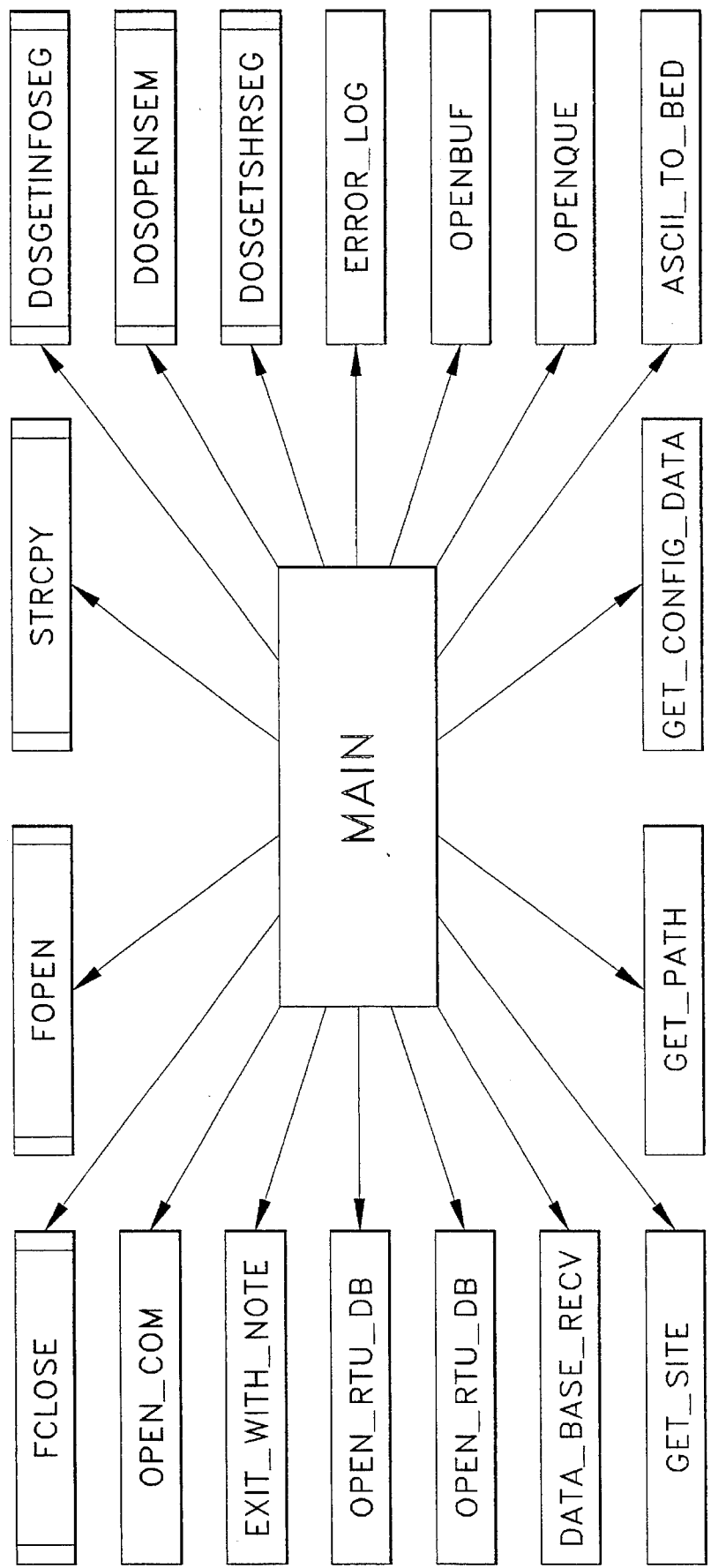
FIG. 18 shows the structure for the X.25-DBR.EXE.

X25-Dbr.Exe (FIG. 18)

FIG. 18 shows the structure of X25_DBR.EXE

DosGetShrSeg

This routine is called to open up the queue in shared memory. We then call openbuf and openque to initialize the segment. This memory has already been allocated by Central.exe. Note that this segment is the size of que_data_strct+1024 bytes. Que_data_strct has a buffer table which is set to sixty four 512 byte buffers.

ASCII-To-Bcd

This function is used to change an ASCII string, used to represent the X.25 caller address, into its decimal equivalent.

This routine takes the first byte, subtracts 0x30, and stores it into the first nibble. It then takes the second byte, pointed to by the string, subtracts 0x30, and stores into the second nibble. Nibble one is then left shifted by four bits and thus becomes the MSN. The routine the logically or's the two nibbles storing the result into the first byte of the bcd string address.

At this point this routine is hard coded to a twelve byte string, and lgth is not used. Bcd_string therefor, should contain enough storage space for the 6 byte value to be stored.

This function returns a void.

Figure 19:
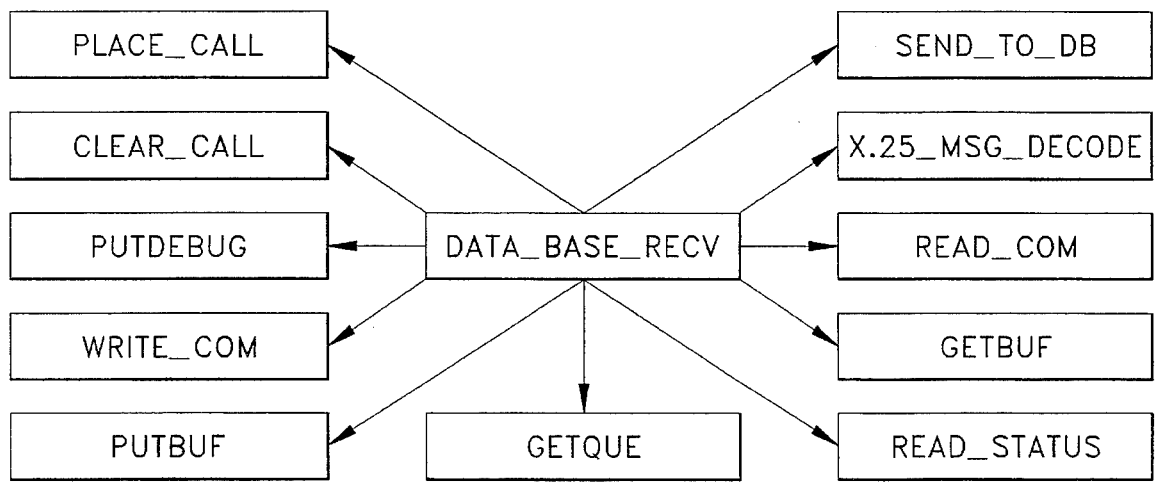
FIG. 19 shows the system operating modes.

Data-Base-Recv (FIG. 19)

The routine, FIG. 19, is responsible for reading information from the specified port. If the poll time has expired then the routine will write a empty buffer to the port to insure that communication is still up. This routine then checks all of the stations control queues for a message. If getque returns a buffer it is then sent to the COM Port. It then checks to see if there is any incoming data to read from the port (other than control data) this routine searches the database for the correct RTU Database an loads the data. If there is data from the communications line then this is entered into the Database.

Clear-Call
include "port_io\x25.h"
include "commtype.h"
void clear_call (lgcl_prt)
int lgcl_prt;

This routine is used to clear a call from a given logical port. On completion of the clear, this routine sets the X.25 state to X.25_IDLE, updates the X.25_t23_time variable, and increments admin_cnt by one.

Data-Base-Recv

If the poll time has expired then the routine will write an empty buffer to the port to insure that communications is still up. This routine then checks all of the stations control queues for a message. If getque returns a buffer it is then sent to the COM Port. It then checks to see if there is any incoming data to read from the port (other than control data) this routine searches the Database for the correct RTU Database an loads the data. If there is data from the communications line then this is entered into the database.

Getbuf

This routine is used to obtain a buffer from the pool

Getque

This routine is used to obtain a buffer from the queue

Place-Call
include "port_io\x25.h"
include "commtype.h"
void place_call(lgcl_prt, site_address, x25_addr)
char *site_address;
int x25_addr;
int lgcl_prt;

This routine is used to place a call to a remote site. The arguments passed to this routine include a pointer to the Read-Status
include "port_io\our_lib.h"
short read_status (short port)

This routine is used to check the status of the communications board. If the I/O control fails this routine will exit. If the status_message-disaster_cs field returned from the board is anything other than zero this routine will exit.

Write-Com
include "port_io/our_lib. h"
write_com(int port, struct bufstruct *message)
int port;
struct bufstruct *message;

This routine is used to set up the port for a write. The first order of business is to determine if the port is ready. If not ready the routine will attempt twenty times and if not ready will return 0. If the IOCTL fails on the port this routine will exit. If the disaster status bit is set on the returned status message this routine will call disaster_sub. If this is successful the message will be written to the port and time message data length will be returned. If the write IOCTL fails debug information will be displayed and this routine will exit.

X25-Msg-Decode
include "commtype.h"
void x25_msg_decode (buff, logical_port)
struct bufstruct *buff;
int logical_port;

This routine take the first byte of the buffer data segment and evaluates it to determine the message type. Valid types include:

INCOMING_CALL—Results in a message displayed that indicates that we have an incoming call packet type.

CALL_CONNECTED—Results in a message being displayed to standard output that a call connected packet has been received, and in addition the X25_state is set to X25_CALL_IN_PLACE, and the error count is cleared.

CLEAR_INDICATION—Results in a message being displayed to standard output that a call clear_indication packet has been received, and includes the cause, diagnostic, and origin strings. The X25_state is set to X25_IDLE.

CLEAR_CONFIRMATION—Results in a message being displayed to standard output that a clear confirmation packet has been received, and includes the origin string as part of the displayed output. The X25_state is set to X25_IDLE.

RESET_INDICATION—Results in a message being displayed to standard output that a reset packet has occurred, and includes the cause, diagnostic, and origin strings. The X25_state is set to X25_IDLE.

RESET_CONFIRMATION—Results in a message being displayed to standard output that a reset confirmation packet has occurred, and includes the origin string. The X25_state is set to X25_IDLE.

RESTART_INDICATION—Results in a message being displayed to standard output that a restart indication packet has been received, and includes the cause, diagnostic, and origin strings.

RESTART_CONFIRMATION—Results in a message being displayed to standard output that a reset confirmation packet has occurred, and includes the origin string. The X25_state is set to X25_IDLE.

The default message that will be displayed for an unknown packet is "UNKNOWN".

Open-Com (FIG. 18)

The open_com function is used to establish a communications link with the DCP/MUXi board. It is used as a means to establish communications with the OS/2 MUXi Communications Driver. Its role is to set the physical protocol, frame protocol, and packet protocol as they apply to the communication standard selected. In addition the bufstruct defines essential data that is protocol specific as well as various other port specific information such as the physical port id and the logical port id.

The logical port is specified by the user. Open_com first opens the control port then proceeds to open the logical port. It waits for the communications link to be established then returns.

Returns: void

This routine will exit(1) with an unexpected halt message, exit(2) if unable to open the control device or the logical port.

Open-Rtu-Db (FIG. 18)

This function is used to setup the RTU Database. This database has been previously created by the start-up process Central.exe. The shared memory segment name is "\sharemem\sta_%04.db" where %04 is the format specifier, used by utilities such as Sprint. The format specifier is replaced with the station configuration number. That is all RTU Databases are created on a per station basis and will be initialized by open_rtu_db. Access to the RTU Databases are maintained by the control database. The control database was initialized by the start-up process Central.exe and was given the name \sharemem\control.db. The control database maintains such information as station count, reader count, writer count.

Open_rtu_db searches the control database to make sure that the database has been setup previously by Central.exe.

If the database exists a semaphore is requested and if successful the address of the database is loaded into the RTU_data array offset by the RTU station number. The control que number is then assigned to the que array for later access.

The read_write_flag has three valid operations. First there is the R flag. The R flag is used to open the RTU Database for reading. The RTU currently supports up to eight (8) processes. Open_rtu_db the validate that the maximum number of readers (8)

Structures used with this module include the rtu_data_struct and the control_rtu_struct Openbuf (FIG. 18)

This routine allocates a buffer for data.

Openque (FIG. 18)

This routine allocates a buffer for the queue.

Figure 20:
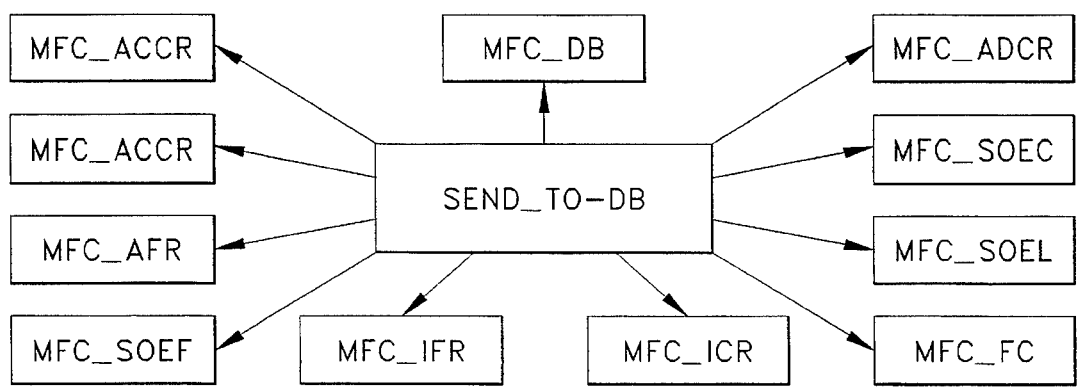
FIG. 20 shows the system architecture (send_to_db X.25_DBR).

System Architecture (FIG. 20)

FIG. 20 shows the send_to_db X25_DBR system architecture. The following routines exist.

KV-Accr (FIG. 20)

KV_accr(rtu_index, msgblock)

USHORT rtu_index struct RTU_comm_struct *msgblock

The information contained in this data packet is defined under struct accum_report_struct. The structure details each field and type. This routine is used to correctly format the data and submit to the correct RTU Database.

The incoming data looks like:

| point | accu_type | length | data |
|---|---|---|---|
| 8 bits | 8 bits | 16 bits | UCHAR*length |

The data field comes in LSB first followed by the MSB. This routine correctly formats the data (16 bit value), and stores it into current_count[point] if accum_type is ACCUM_COUNTER else it stores the information into frozen_count[point]. For more information on frozen_count and current_count see rtu_data_struct. This routine uses point as an index into the frozen_count and current_count and is incremented for each 2 byte data value. A master that sent a multiple byte data field would have this information stored at point n up to point n+(length/2), where n is the value found in the first 8 bits of the data stream.

KV-Acr—Analog change report (FIG. 20)

KV_acr(rtu_index, msgblock)

USHORT rtu_index struct RTU_comm_struct *msgblock

The information contained in this data packet is defined under struct analog_report_struct. This structure has details on each field and type. This routine is used to correctly format the data and submit it to the correct RTU Database.

The incoming data looks like:

| point | pad | length | data |
|---|---|---|---|
| 8 bits | 8 bits | 16 bits | UCHAR*length |

The data field comes in LSB first followed by the MSB. This routine correctly formats the data (16 bit value), and stores the results into analog_data[point]. For more information on analog_data see rtu_data_struct. Please note that this routine overwrites this value if more than 2 bytes of data are present. Thus the data stored into analog_data is (data[length]<<8)+data [length-1].

KV-Adcr-ADC Reference Report (FIG. 20)
KV__adcr(rtu__index, msgblock)
USHORT rtu__index
struct RTU__comm__struct *msgblock
  This routine is a stub.
KV-Afr Analog Force Report (FIG. 20)
KV__afr(rtu__index, msgblock)
USHORT rtu__index
struct RTU__comm__struct *msgblock
  The information contained in this data packet is defined under struct analog__report__struct. This structure for details on each field and type. This routine is used to correctly format the data and submit it to the correct RTU Database.
  The incoming data looks like:

| point | pad | length | data |
|---|---|---|---|
| 8 bits | 8 bits | 16 bits | UCHAR*length |

KV-Fc-Firmware Configuration (FIG. 20)
KV__fc(rtu__index, msgblock)
USHORT rtu__index
struct RTU__comm__struct *msgblock
  This routine is a stub.
KV-Icr-Indication Change Report (FIG. 20)
KV__icr(rtu__index, msgblock)
USHORT rtu__index
struct RTU__comm__struct *msgblock
  The information contained in this data packet is defined under struct status__report__struct. See this structure for details on each field and type. This routine is used to correctly format the data and submits it to the correct RTU Database.
  The incoming data looks like:

| point | pad | length | data |
|---|---|---|---|
| 8 bits | 8 bits | 16 bits | UCHAR*length |

The index into the status__simple__data array is point/8 where point is incremented by one for each data byte. This effectively separates the data into 8 one byte values. The first byte is stored into point/8, the second into point+⅛, the last in point+length/8. Thus only every eight data byte will be stored. This routine stores the data into status__simple__data [point], if type is STATUS__SIMPLE, into status__1bit__data, if type is STATUS__1BIT, and into status__2bit__change, if type is STATUS__2BIT. Simple status data is stored starting at the location point/8 up to length+(point/8). Each consecutive byte is loaded into the simple__status__data array. One bit status data is stored into status__1bit__data in a similar manner. Two bit status is loaded first byte into status__2bit__data array, and the second data byte is logically ored with the status__2bit__change array. Status__2bit__change is a two dimensional array indexed by the number of readers of that particular RTU Database.
KV-Ifr—Indication Force Report (FIG. 20)
KV__ifr(rtu__index, msgblock)
USHORT rtu__index
struct RTU__comm__struct *msgblock
  The information contained in this data packet is defined under struct status__report__struct. See this structure for details on each field and type. This routine is used to correctly format the data and submit it to the correct RTU Database.
  The incoming data looks like:

| point | pad | length | data |
|---|---|---|---|
| 8 bits | 8 bits | 16 bits | UCHAR*length |

Figure 21:
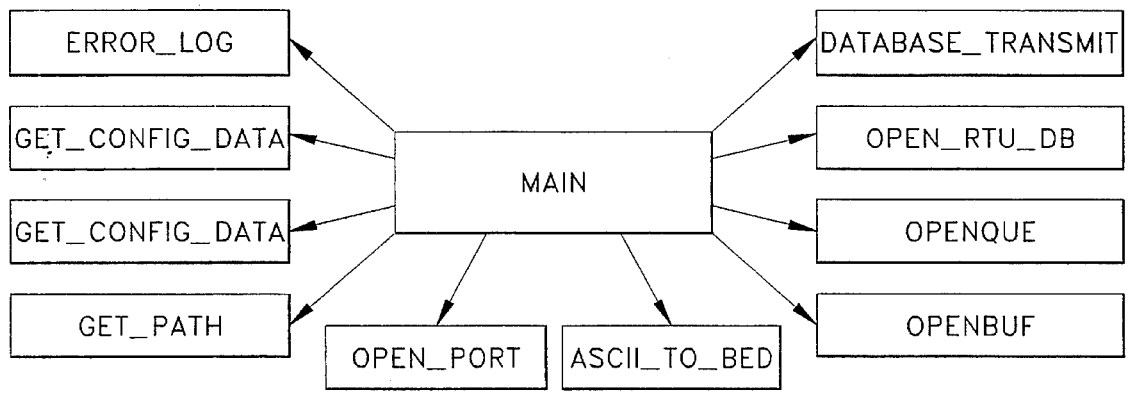
FIG. 21 shows the system modes of operation.

This routine stores each consecutive byte into status__simple__data[point], if type is STATUS__SIMPLE, into status__1bit__data, if type is STATUS__1BIT, and into status__2bit__change, if type is STATUS__2BIT. Simple status data is stored starting at the location point/8 up to length+(point/8). Each consecutive byte is loaded into the simple__status__data array. One bit status data is stored into status__1bit__data in a similar manner. Two bit status is loaded first byte into status__2bit__data array, and the second data byte is logically ORed with the status__2bit__change array. Status__2bit__change is a two dimensional array indexed by the number of readers of that particular RTU Database.
KV-Soec—SOE Change Report (FIG. 20)
KV__soec(rtu__index, msgblock)
USHORT rtu__index
struct RTU__comm__struct *msgblock
  This routine is a stub.
KV-Soef-SOE Force Report (FIG. 20)
KV__acr(rtu__index, msgblock)
USHORT rtu__index
struct RTU__comm__struct *msgblock
  This routine is a stub at this time.
KV-Soel-SOE Log Report (FIG. 20)
KV__soel(rtu__index, msgblock)
USHORT rtu__index
struct RTU__comm__struct *msgblock
  This function is a stub.
KV-Tb-Time Bias
KV__tb(rtu__index, msgblock)
USHORT rtu__index
struct RTU__comm__struct *msgblock
  This routine is a stub.
Send-To-Db
void send__to__db(rx__buf, rtu__index)
struct bufstruct *rx__buf;
USHORT rtu__index;
  The data sent this routine in the receive buffer is cast to a struct RTU__comm__struct. The RTU__comm__struct has more details. This information is then used to determine the type of incoming data as it pertains to the RTU Database. Funct.h has details. Once this is determined an conversion function is called to translate the data into the correct format and submit to the appropriate RTU Database, as specified by rtu__index.
Data Flow, System Operation and Architecture (FIGS. 11 and 20–22)
  X25-Dbx.Exe
data__base__transmit
  This routine is responsible for reading incoming messages to verify the other side is up and running. If a data message arrives this routine will place it on the correct database queue. It then proceeds to verify the current state of the call to insure that it is "in place." If it is then both analog data, in message sizes that does not exceed max__analog__points__pre__msg, and status will be forwarded to the correct host. These messages are called reports.
  A conversion function is operated on each of these data types to create the correctly formatted report.
  FIG. 21 shows that x.25 RTU Database transmitter system architecture modes of operation.

Figure 22:
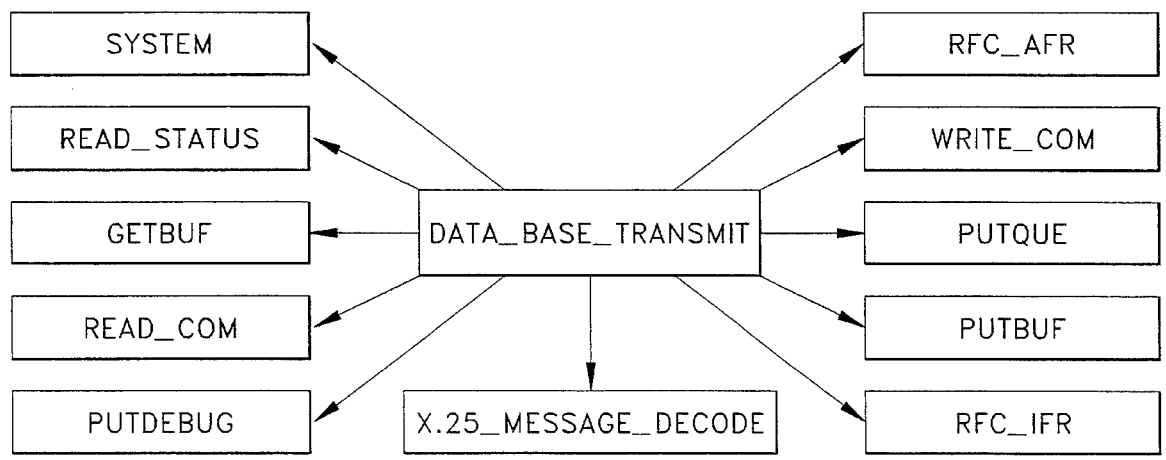
FIG. 22 shows the system architecture (data_base_transmit Operating Mode).

FIG. 22 shows the system architecture for the database transmit mode.

This routine allocates a buffer for data
Openque
This routine allocates a buffer for the queue
Data-Base-Transmit This routine is responsible for reading incoming messages to verify the other side is up and running. If a data message arrives this routine will place it on the correct database queue. It then proceeds to verify the current state of the call to insure that it is "in place." If it is then both analog data, in message sizes that does not exceed max_analog_ points_pre_msg, and status will be forwarded to the correct host. These messages are called reports.

A conversion function is operated on each of these data types to create the correctly formatted report.
Getbuf This routine is used to obtain a buffer from the pool
Putbuf This routine returns a buffer to the buffer pool.
Putdebug
include "commtype.h"
void putdebug(msg_type, lgcl_prt_num, serial_num, buffer)
int msg_type, lgcl_prt_num, serial_num
struct bufstruct *buffer;

This routine is used to place "buffer" on the queue that is specified by the extern debug_que_number. This queue can later be read to view the messages that presumably have been sent to the driver. This routine overwrites the bufstruct entries msg_type, port, count and msg_time with the parameters passed to it (that is msg_type, lgcl_prt, and serial_num respectively). msg_time is just the current number of msg_type that has passed.
Read-Com
include "port_io/our_lib.h"
int read_com (port, message)
int port;
struct bufstruct *message;

This routine is used to issue a read command to the driver and indicate the size of the data segment to be returned. This routine checks the DCP/MUXi status, if down logs an error and exits. It then checks the return value of return_stat struct stat_msg->disaster_cs, if not zero logs an error and exits. The routine then proceeds to check the status message to see if the DCP/MUXi is in the RDY state, if it is not the return 0, otherwise read data from the port and return the length of the data read. If the IOCT1 fails this routine logs a message and returns a 0.
Read-Status include "port_io/our_lib.h"
short    read_status(short port)

Figure 23:
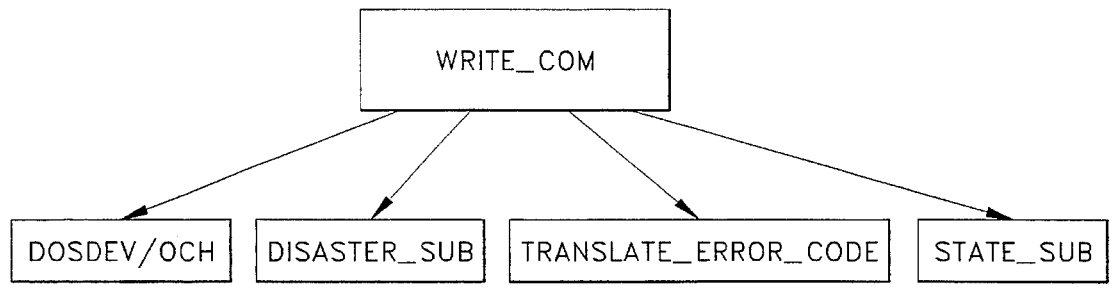
FIG. 23 shows the system architecture (write_com).
Figure 24:
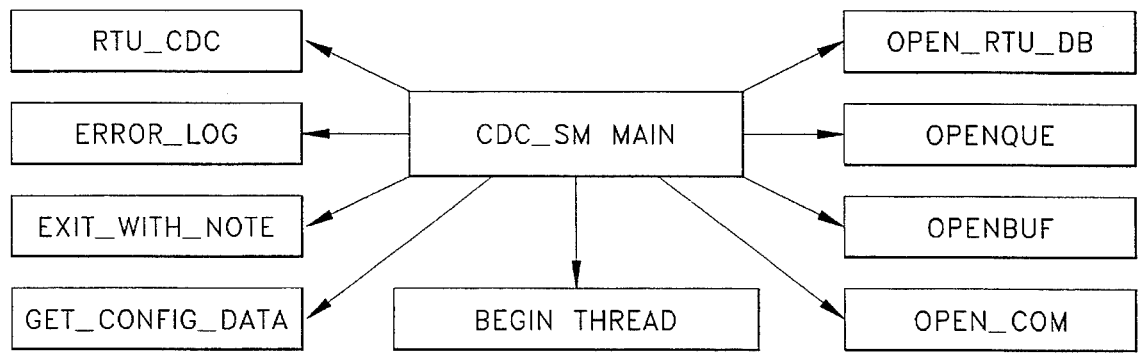
FIG. 24 shows the system operating mode (master RTU system architecture).

This routine is used to check the status of the communications board. If the Ioctl fails this routine will exit. Based on the status_message->disaster_cs field returned this routine will exit.
Rfc-Afr
include x25_dbxt.h
void rfc_afr (rtu_index, rdr_indx, start_point, stop_point, data_buf)
USHORT rtu_index, rdr_indx, start_point, stop_point;
struct bufstruct *data_buf;

This routine is used to format outgoing analog data. The format of the outgoing data is defined in the structure RTU_comm_struct. The routine uses the data_buf as the transmit buffer, however prior to transmission it will update the data_lgth to RTU_COMM_HEADER_SIZE+ ANALOG_REPORT_HEADER_SIZE, set the station number to the value specified by the rtu_index, set rtu_control to zero, set the function to type AFR_FC, add start_point to rtu_info.analog_offset (as defined in the rtu_Database), and then from the start point to the stop point the data is added to the transmitted buffer, and stored in the analog_report.data field.
Rfc-Ifr
include x25_dbxt.h
void rfc_afr (rtu_index, rdr_indx, data_buf)
USHORT rtu_index, rdr_indx;
struct bufstruct *data_buf;

This routine is used to format outgoing change data. Change data of this form is referred to as Indication Force Report. The format of the outgoing data is defined in the structure RTU_comm_struct. The routine uses the data_buf as the transmit buffer, however prior to transmission it will update the data_lgth to RTU_COMM_HEADER_SIZE+STATUS_REPORT_HEADER_SIZE, set the station number to the value specified by the rtu_index, set rtu_control to zero, set the function to type IFR_FC, set the status_type to STATUS_2BIT, set the start_point to zero and update the report_data with the information in status_2bit_data.
System Architecture (FIG. 23)
Write-Com FIG. 23 depicts the system architect for write_com.
Stat-Sub This routine prints out data from the return_stat_struct. This information includes such items as status of the MUXi registers. See return_stat_struct for details.
Translate-Error-Code This routine translates error numbers into error strings for logging into the error file.
Messages include:
the port has not been opened PORT_NOT_OPENED
the receive data is larger than DATA_SIZE RECV_BUFFER_TO_BIG
We expected the receiver to be ready RECV_NOT_READY
The buffer is larger than DATA_SIZE XMIT_BUFFER_TO_BIG
We expected the xmitter to be ready XMIT_NOT_READY FIG. 24 shows the System Operating Mode for the CDC Synthetic Master RTU System Architect for the CDC Synthetic Master Emulation.

Figure 25:
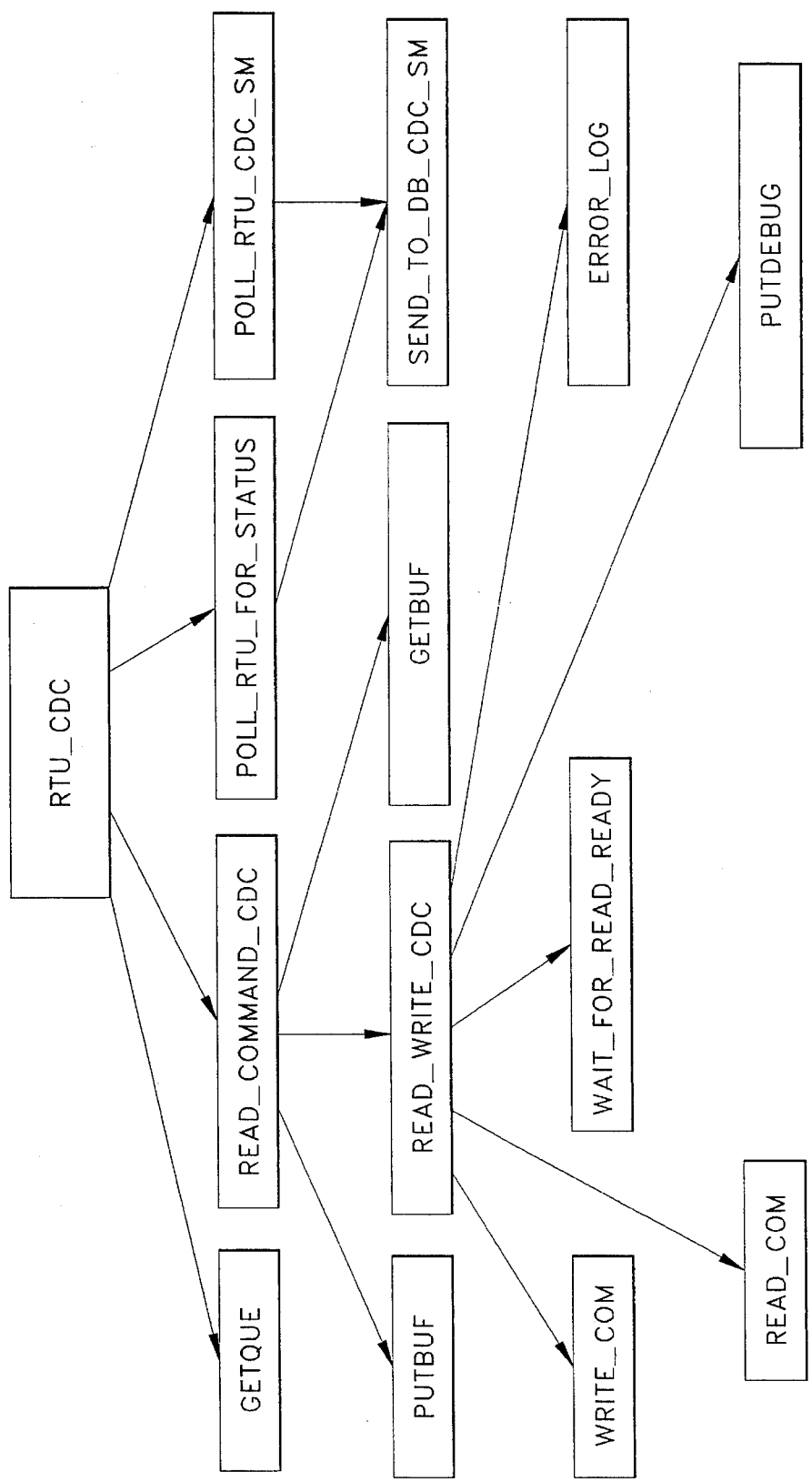
FIG. 25 shows the system operating mode (system architecture—rtu_cdc).

FIG. 25 shows the System Operating Mode for the RTU_CDC System Architecture.

The program listing pertains to the data structures used in the functions detailed in relation to the different programs illustrated in various of FIGS. 17 to 25.

RTU-Comm-Struct

```
#include "structs.h"
35  USHORT              station_number
```

```
        UCHAR           rtu_control
        UCHAR           function
        union comm_msg_union    comm_msg
```

5              Accum-Report-Struct

```
#include "structs.h"
#define RTU_COMM_SIZE 512
struct accum_report_struct {
        UCHAR point;    // point address that data refers to
        UCHAR accum_type;// frozen or not frozen (funct.h)
        USHORT length; // number of bytes of data
        UCHAR data[RTU_COMM_SIZE];
}
```

Analog-Report-Struct

```
#include "structs.h"
#define RTU_COMM_SIZE 512
struct analog_report_struct {
        UCHAR   point;                  // starting point
        UCHAR   pad;                    // not used
        USHORT  length;                 // number of bytes of data
        USHORT  data[RTU_COMM_SIZE/2];  // data segment
}
```

Bufstruct

```
struct bufstruct
  {
    USHORT buff_ptr;
    short data_lgth;
    short data_offset;
    char buff_status;
    char buff_pad;
```

```
          union
            {
              char   data[DATA_SIZE];
              struct open_struct
                {
                       char   control;
                  char   physical_port;
                  char   logical_port;
                  char   packet_protocol;
                  char   frame_protocol;
                  char   phys_protocol;
                  char   protocol_mode;
                  char   recv_intrp_enbl;
                  char   xmit_intrp_enbl;
                  USHORT baud_rate;
                  short  read_time_out;
                  short  xmit_time_out;
                  short  reply_time_out;
                  short  max_recv_que_count;
                  short  max_xmit_que_count;
                  short  debug_flag;
                  union
                    {
                      struct async_open_data
                        {
                           short  max_count;       /* maximum number of chts to receive */
                           short  eol_count;       /* number of possible terminator chts in following list */
                           char eol_list[16];      /* list of End Of Line (terminator) chts */
                           short ignr_count;       /* number of characters in the ignore list */
                           char ignr_list[16];     /* list of chts to not receive */
```

```
            } async;
          struct tsp_open_data
          {
            short max_count;
            } tsp;
          struct dg_open_data
          {
            short max_count;
            } dg;
          struct bisync_open_data
            {
            char poll_addr[8];
            char select_addr[8];
            } bisync;
            struct X25_open_data
              {
/*
* physical
*/
/*
* frame
*/

UCHAR frame_window_size;
              USHORT  frame_time_out;
              UCHAR frame_mode;
/*
* packet
*/
              UCHAR packet_window_size;
              USHORT  packet_time_out;
              USHORT  local_address_lgth;/* length in nibbles
*/
              UCHAR local_address[MAX_X25_ADDRESS_LENGTH];
```

```
                USHORT remote_address_lgth; /* length in
        nibbles */
                UCHAR remote_address[MAX_X25_ADDRESS_LENGTH];
                USHORT  facilities_lgth; /* length in bytes */
                UCHAR facilities[MAX_X25_FACILITIES_LENGTH];
                USHORT  user_data_lgth;  /* length in bytes */
                UCHAR user_data[MAX_X25_USER_DATA_LENGTH];
                USHORT  lu_max;
                USHORT  lu_min;
                UCHAR call_placement_flag;
                UCHAR packet_mode;
                } X25;
        /*  */
            struct lu2_open_data
                {
        /*
         * physical
         */
        /*
         * frame
         */
                USHORT  frame_time_out;
                USHORT  no_resp_timeout;
                ULONG phys_unit_ID;
                UCHAR D,C_addr;
                UCHAR frame_window_size;
                UCHAR frame_mode;
        /*
         * packet
         */
                USHORT  packet_time_out;
                UCHAR local_address;
                UCHAR remote_address;
                UCHAR packet_mode;
                UCHAR open_type;
```

```
            UCHAR last_open;
          } lu2;
        } prot;
       } open_data;
    }protocol;
};

call_clearing include "port_io\x25.h"
struct call_clearing {
    unsigned char msg_type;
    unsigned char cause;
    unsigned char diagnostic;
    unsigned char origin;
} call_placing include "x25.h"
struct call_placing {
    unsigned char msg_type;
    USHORT remote_address_lgth;
    unsigned char remote_address[MAX_X25_ADDRESS_LENGTH]
    USHORT facilities_lgth;
    unsigned char facilities[MAX_X25_FACILITIES_LENGTH]
    USHORT user_data_lgth;
    unsigned char user_data[MAX_X25_ADDRESS_LENGTH]
} cdc_dat_struct include "structs.h"
struct   cdc_dat_struct {
    UCHAR func   :4;
```

```
        UCHAR rtu_addr    :4;
        union cdc_msg_union cdc_msg;
    };

cdc_msg_union include "struct.h"
    #define CDC_DATA_SIZE 512
    union cdc_msg_union
    {
        UCHAR data[CDC_DATA_SIZE];
        struct    sbo_select_struct sbo_select;   // For trip
    and close
        struct    direct_operate_struct direct_operate; //
    Direct trip or Close
        struct    setpoint_struct setpoint; // Setpoint
        struct    scan3_cmd_struct    scan3_cmd; // Scan 3
    command
    };
    sbo_select_struct {
        UCHAR point;    // for Trip or Close command
    };
    struct direct_operate_struct {
        UCHAR point;    // Direct Trip or Close
    };
    struct setpoint_struct {
        USHORT value_msn :4;
        USHORT point :4;
        USHORT value_lsb :8;
    };
    struct scan3_cmd_struct
    {
        UCHAR start_address;
        UCHAR stop_address;
    };
```

```
                        comm_msg_union struct relay_command_struct  relay_command
                UCHAR      point
 5              UCHAR      command;
                USHORT     value
            struct direct_operate_struct   direct_operate
                UCHAR      point
            struct comm_setpoint_struct    comm_setpoint
10              USHORT     value_msn :4
                USHORT     point :4
                USHORT     value_lsb :8
            struct analog_report_struct    analog_report
                UCHAR      point
15              UCHAR      pad
                USHORT     length
                USHORT     data[RTU_COMM_SIZE/2] // 512/2
            struct status_report_struct    status_report
                UCHAR      point
20              UCHAR      status_type
                USHORT     length
                UCHAR      data[RTU_COMM_SIZE]
            struct accum_report_struct     accum_report
                UCHAR      point
25              UCHAR      accum_type
                USHORT     length
                UCHAR      data[RTU_COMM_SIZE]

control_rtu_struct
30
        #include "cen_data.h"
        MAX_RTU    16
        MAX_READER    8
        USHORT    station_count
35      USHORT station_number[MAX_RTU]
```

```
      USHORT  db_reader_count
      USHORT  reader_pid[MAX_RTU*MAX_READER]    //   128
      USHORT  db_writer_count
      USHORT  writer_pid[MAX_RTU]
 5    USHORT     db_monitor_count
      USHORT  monitor_pid[MAX_RTU]
      USHORT  debug_que_number
      USHORT  max_debug_que_count
      UCHAR      local_site_name[32]
10 que_data_struct

MAXQUE  20
      NBUFS       64
15    BUFSIZE    512
      SEGNAME      "\\sharemem\\que_shar.seg"
      SEMNAME      "\\sem\\que.SEM"
      QUE_SEMNAME     "\\sen\\que%d.SEM"
      UNIT_DATA_NAME "\\sharemem\\unitdata.seg"
20    unsigned quelst[MAXQUE]
      unsigned que_count[MAXQUE]
      unsigned emtlst
      unsigned bufcnt
      unsigned buftbl[NBUFS]
25    union {
            char *pointer
            struct {
                unsigned offset
                unsigned segment
30          } partial
              } requester[NBUFS]
      unsigned pid[NBUFS]
      unsigned char pool[NBUF*BUFSIZE]
``` return_stat_struct

```
#include "port_io/com_strc.h"
struct return_stat_struct
{
   ULONG recv_intrp_flag;    /* bit true (1) marks new
recv data ready */
   ULONG recv_intrp_enbl;    /* bit true (1) enables recv
intrpt for new data */
   ULONG xmit_intrp_flag;    /* bit true (1) marks xmit
ready */
   ULONG xmit_intrp_enbl;    /* bit true (1) enables xmit
intrpt for new data */
   unsigned char admin_intrp_flag;   /* bit 0 is flags
admin data ready */
   unsigned char admin_intrp_enbl;   /* bit 0 true will
allow interrupt */
   USHORT  pool_segment;      /* the base segment of the
buffer pool */
   short           dp_pad[5];        /* to pad out to
segment boundary */
   short           mux_running;      /* this cell is
incremented for each mux scan */
/*   */
   char logical_port_open;
   char phys_port_number;
   char x_que_max;
   char x_que_cnt;
   char r_que_max;
   char r_que_cnt;
   char xmit_status;
   char recv_status;
   char x_int_status;
   char r_int_status;
   char port_tbl_indx;
```

```
        char xmit_buff_window;
        USHORT xmit_buff_window_offset;
        char return_stat_struct_pad2;
        char recv_buff_window;
        USHORT recv_buff_window_offset;
    /* */
        char return_stat_struct_pad3;
        char x_int_buff_window;
        USHORT x_int_buff_window_offset;
        char return_stat_struct_pad4;
        char r_int_buff_window;
        USHORT r_int_buff_window_offset;
    /* */
        short disaster_ip;
        short disaster_cs;
        short disaster_ax;
        short disaster_bx;
        short disaster_cx;
        short disaster_dx;
        short disaster_di;
        short disaster_si;
        short disaster_es;
        short disaster_ds;
        short disaster_ss;
        short disaster_sp;
        short disaster_bp;
        short disaster_fl;
    /* */
        short phys_seg;
        short phys_offset;
        short virt_seg;
        short virt_offset;
        short size_of_dual;
```

```
        short local_seg;
        short help_flags;
        };

RTU-Data-Struct

This structure includes all the RTU data
information, necessary for storage. The definition of
this structure is as follows:

MAX_READER      8
struct    rtu_info_struct
UCHAR     rtu_onl
UCHAR     rtu_proc_time
UCHAR     rtu_header[MAX_READER]
ULONG     last_data_time
USHORT    write_access_count;
USHORT    read_access_count[MAX_READER]
USHORT    control_send_count
USHORT    analog_data[MAX_ANL]
UCHAR     analog_flag[MAX_READER]
sbo_store_struct
struct sbo_store_struct {
        UCHAR point;            // The selected point number
        UCHAR state;            // The current state of the
point
        UCHAR cmd;              // The issued command (functs.h)
        UCHAR pad;              // pad to make structure uniform
        USHORT value;           //
        ULONG select_time;      // time located in GINFOSEG
} status_report_struct include "structs.h"
```

```
#define RTU_COMM_SIZE 512
struct status_report_struct {
    UCHAR point;
    UCHAR status_type;
    USHORT length;
    UCHAR data[RTU_COMM_SIZE];
};
```

Figure 26:
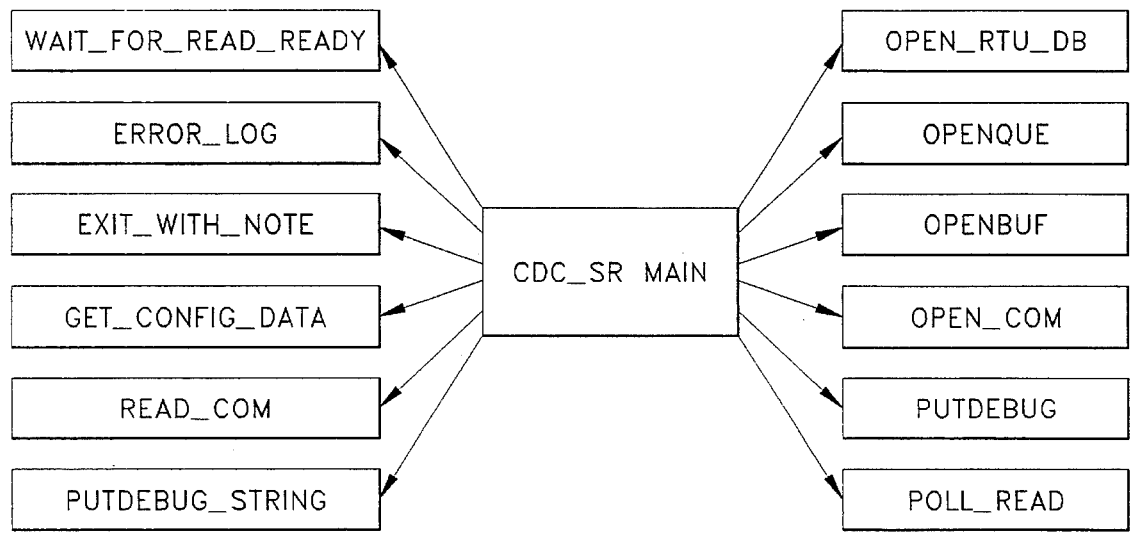
FIG. 26 shows the structure of the CDC SM.EXE process (CDC synthetic RTU).

FIG. 26 shows the structure of the CDC_SM.EXE Process for the CDC Synthetic RTU.
poll_read
void poll_read (recv_data,rcv_lgth, rtu_index)
struct cdc_data_struct *recv_data;
USHORT rcv_lgth, rtu_index;
This routine is used to take a recv_data buffer that was read off appropriate port. The data contained in this routine is described in the structure cdc_data_struct. This structure supports type 1 CDC protocol. The rtu_index as an index into the sbo_store array, which is an array of sbo_store_ structs. The rcv_lgth is the length of the data passed in the recv_data buffer.

The first item that this routine does is update two arrays, modem_rcv and modem_cht_rcv. The modem_rcv array is a count of the number of times that this routine has been called. modem_cht_rcv is an array that contains the total length of the data that has been submitted to this routine.

Next, this routine obtains a buffer from the buffer pool, if none are available this routine prints an error message and returns. This routine then evaluates the type of function calls the correct retrieving functions.
Type of Functions supported:
SCAN_1
Change the sbo_store array member state to DESELECTED, Call rfc_stat with start set to 0 and stop set to FF (255, Collecting all data between points 0 and 255). Call rfc_anlg with start set to 0 and stop set to 255 to collect all analog data at points 0 to 255. Correct the data length of the data buffer and then transmit the data to Comm Driver for transmission.

The data will be collected from the database based on the "start 2bit chg" and "num 2bit chg" parameters found in the stations configuration file. This parameters specify the location where data will be stored and then number of bits (length) of data respectively. If start and stop are not within the range (start> start_2bit_chg, stop<num_2bit_chg/8–1) then they are adjusted to fall within the range. This information is used to verify that the start and stop parameters fall within the correct range.
SCAN_2:
Set the status of the sbo_store array to DESELECTED. Do a scan of status information only. Call rfc_stat with start set to 0 and stop set to 255.
SCAN_3
Set the status of the sbo_store array to DESELECTED, set the start, stop, transmit buffer start and transmit buffer stop points to the value specified in the message. Call rfc_stat to obtain status information, call rfc_accm to get accumulator information, call rfc_anlg to get analog information.
Direct-Setpoint
Set the state of sbo_store to DESELECTED. Store all of the data elements in the transmit buffer. Call rfc_dset, if return TRUE continue, else set transmit buffer function to NO_OPERATION and transmit the response.
No-Operation
Set the state of sbo_store to DESELECTED and write an empty buffer to the Comm port.
Control-Trip:
Set the transmit buffer to include the point, call rfc_trip and transmit the buffer.
Control-Close:
Set the transmit buffer to include the point, call rfc_close and transmit the buffer.
Setpoint
Set the transmit buffer to include point, value_msn and value_lsb. Call rfc_setpoint and transmit the buffer.

Figure 27:
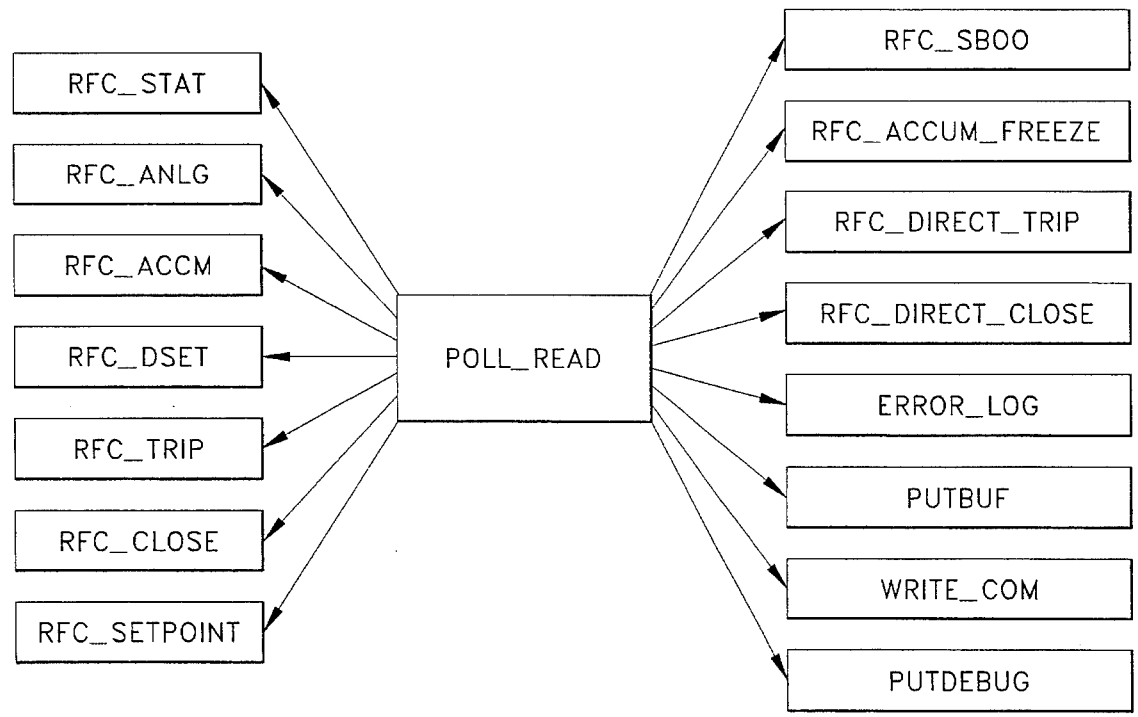
FIG. 27 shows the system architecture (structure diagram of poll_read routine).

Operate
Call rfc_sboo if a return value of TRUE, transmit the buffer, else set the transmit buffer func to NO_OPERATION and transmit the buffer.
Reset:
Set the sbo_store array member state to DESELECTED and call rfc_reset. If rfc_reset returns a value of TRUE, transmit the buffer, else set the transmit buffer func to NO_OPERATION and transmit the buffer.
Accumultr-Freeze
Set the sbo_store array member state to DESELECTED and call rfc_accum_freeze. If rfc_accum_freeze returns a value of TRUE, transmit the buffer, else set the transmit buffer func to NO_OPERATION and then transmit FIG. 27 shows the structure diagram of the poll_read routine.
Error-Log
include "port_io\our_lib.h"
void error_log(msg, pgm_name)
char msg [], *pgm_name;
This routine is used to print out a message, msg, to the logfile. The name of the log file will be pgm_name, with all leading characters ie "\:" etc stripped off, followed by the extension of ".err". If pgm_name is not specified this routine will default to creating a file in the current directory with the name of com_pgms.err.

The message will be formatted as follows: pgm_name- day month year hour minute second Message This message is printed to the file and the file is closed. This routine attempts to open the file in "a" (append) mode and if unable to do so after ten tries it just returns. This should be addressed, to return a know value.
Poll-Read
void poll_read (recv_data,rcv_lgth, rtu_index)
struct cdc_data_struct *recv_data;
USHORT rcv_lgth, rtu_index;
This routine is used to take a recv_data buffer that was read off appropriate port. The data contained in this routine is described in the structure cdc_data_struct. This structure supports type 1 CDC protocol. The rtu_index as an index into the sbo_store array, which is an array of sbo_store_ structs. The rcv_lgth is the length of the data passed in the recv_data buffer.

The first item that this routine does is update two arrays, modem_rcv and modem_cht_rcv. The modem_rcv array is a count of the number of times that this routine has been called. modem_cht_rcv is an array that contains the total length of the data that has been submitted to this routine.

Next, this routine obtains a buffer from the buffer pool, if none are available then this routine prints an error message and returns. This routine then evaluates the type of function calls the correct retrieving functions.
Type of Functions supported:
SCAN_1
Change the sbo_store array member state to DESELECTED, Call rfc_stat with start set to 0 and stop set to FF (255, Collecting all data between points 0 and 255). Call rfc_anlg with start set to 0 and stop set to 255 to collect all analog data at points 0 to 255. Correct the data length of the data buffer and then transmit the data to Comm Driver for transmission.

Please note that will be collected from the database based on the "start 2bit chg" and "num 2bit chg" parameters found in the stations configuration file. This parameters specify the location where data will be stored and then number of bits (length) of data respectively. If start and stop are not within the range (start> start_2bit_chg, stop<num_2bit_chg/8–

1) then they are adjusted to fall within the range. This information is used to verify that the start and stop parameters fall within the correct range . . . SCAN_2:

Set the status of the sbo_store array to DESELECTED. Do a scan of status information only. Call rfc_stat with start set to 0 and stop set to 255.

SCAN_3

Set the status of the sbo_store array to DESELECTED, set the start,stop, transmit buffer start and transmit buffer stop points to the value specified in the message. Call rfc_stat to obtain status information, call rfc_accm to getaccumulator information, call rfc_anlg to get analog information.

Direct-Setpoint

Set the state of sbo_store to DESELECTED. Store all of the data elements in the transmit buffer. Call rfc_dset, if return TRUE continue, else set transmit buffer function to NO_OPERATION and transmit the response.

No-Operation

Set the state of sbo_store to DESELECTED and write an empty buffer to the Comm port.

Control-Trip:

Set the transmit buffer to include the point, call rfc_trip and transmit the buffer.

Control-Close:

Set the transmit buffer to include the point, call rfc_close and transmit the buffer.

Setpoint

Set the transmit buffer to include point, value_msn and value_lsb. Call rfc_setpoint and transmit the buffer.

Operate

Call rfc_sboo if a return value of TRUE, transmit the buffer, else set the transmit buffer func to NO_OPERATION and transmit the buffer.

Reset:

Set the sbo_store array member state to DESELECTED and call rfc_reset. If rfc_reset returns a value of TRUE, transmit the buffer, else set the transmit buffer func to NO_OPERATION and transmit the buffer.

Accumultr-Freeze

Set the sbo_store array member state to DESELECTED and call rfc_accum_freeze. If rfc_accum_freeze returns value of TRUE, transmit the buffer, else set the transmit buffer func to NO_OPERATION and then transmit Putbuf Return a buffer to the buffer pool Putdebug include "commtype.h"

void putdebug(msg_type, lgcl_prt_num, serial_num, buffer)

int msg_type, lgcl_prt_num, serial_num struct bufstruct *buffer;

This routine is used to place "buffer" on the queue that is specified by the extern debug_que_number. This queue can later be read to view the messages that presumably have been sent to the driver. This routine overwrites the bufstruct entries msg_type, port, count and msg_time with the parameters passed to it (that is msg_type, lgcl_prt, and serial_num respectively). msg_time is just the current number of ms that has passed.

Rfc-Accm

USHORT rfc_accm (data_buff, start, stop, rtu_index)

char data_buff[];

USHORT stop, start, rtu_index;

This routine checks to see that the start and stop points are at least within the range specified by the start_current_count, and counter_ptcnt values located in the RTU Database. Thus if the start_current_count is greater than the start parameter, then start_current_count will be used, likewise if counter_ptcnt −1 less than stop then counter_ptcnt −1 will be used. If the first point is less than or equal to the last the data will be loaded into the buffer. Note (rfitz) the data will be read from the start_current_count up to counter_ptcnt as it is written. This routine then applies the same rule to the frozen count data.

The data elements accessed by this routine include:

current_count is an array of 256 8 bit elements. This routine reads each byte into the transmit buffer. frozen_count is an array of 256 8 bit elements. This routine reads each byte into the transmit buffer.

Returns:

0 if counter_ptcnt in the RTU Database is zero, otherwise it returns the number bytes of data placed in the buffer.

Rfc-Accum-Freeze void rfc_accum_freeze (point, value, rtu_index)

USHORT point, rtu_index, value;

This routine sets the following parameters, as defined in RTU_comm_struct: function is set toACFZ_FC. A buffer is then obtained from the buffer pool and this information is then put on the control que by a call to put_on_cntl_que.

Returns:

FALSE if unable to get a buffer from the pool, or unable to place the buffer on the control queue, otherwise returns TRUE.

Rfc-Anlg

USHORT rfc_anlg(data_buff, start, stop, rtu_index)

char data_buff[];

USHORT stop, start, rtu_index;

This routine checks to see that the start and stop points are at least within the range specified by the start_analog, and analog_ptcnt −1 values located in the RTU Database. Thus if the start_analog value is greater than the start parameter, then start_analog will be used, likewise if analog_ptcnt −1 is less than stop then analog_ptcnt −1 will be used. If the first point is less than or equal to the last the data will be loaded into the buffer.

Note: The data in the array will first masked with 0x0FF0 and the logically shifted by 4 bits. This same data is then masked with 0x0F and logically shifted by 12 bits. These two values are then logically ored and the result is then loaded into the buffer. For example:

0000 0XX0→0000 00XX 0000 000X→0000 X000

After the or you have

0000X0XX

This has caused the data from the LSByte to Move to the MSByte and have bytes 1 and 2 move to LSB (ie position 0 and 1).

This routine then applies the same rule to the frozen values data.

Returns:

0 if counter_ptcnt in the RTU Database is zero, otherwise it returns the number bytes of data placed in the buffer.

Rfc-Close void rfc_close(point, rtu_index)

USHORT point, rtu_index;

This routine sets the following parameters, as defined in sbo_store_struct: point is set to the parameter point, state is set to SELECTED, cmd is set to CLOSE_CMD, and time is set to the number of seconds currently being reported by the system.

Rfc-Direct-Close void rfc_direct_close(point, rtu_index)

USHORT point, rtu_index;

This routine calls rfc_close to set the point and then calls the routine rfc_sboo to close the point and returns its return value.

Return:
TRUE if successful otherwise FALSE.
Rfc-Direct-Trip
void rfc_direct_trip(point, rtu_index)
USHORT point, rtu_index;
This routine calls rfc_trip to set the point and then calls the routine rfc_sboo to close the point and returns its return value.
Return:
TRUE if successful otherwise FALSE.
Rfc-Dset
void rfc_dset(point, value, rtu_index)
USHORT point, rtu_index, value;
This routine sets the following parameters, as defined in RTU_comm_struct: comm_setpoint.point is set to the parameter point, comm_setpoint.value is set to the parameter value, and function is set to CDC_DS_FC. A buffer is then obtained from the buffer pool and this information is then put on the control que by a call to put_on_cntl_que.
Returns:
FALSE if unable to get a buffer from the pool, or unable to place the buffer on the control queue, otherwise returns TRUE.
Rfc-Sboo
BOOL rfc_sboo(rtu_index)
USHORT rtu_index;
This routine first insures that the point has already been selected and that the point has not been selected for longer that four seconds. If these conditions are true then the routine obtains a buffer from the pool and sets the following parameters, as defined in RTU_comm_struct: If the command is SETPOINT_CMD relay_command.point is set to the point defined in the sbo_store array with the offset rtu_index, relay_command.command is set to cmd and relay_command.value is set to value in a similar manner, the value of function is set to SBOS_FC. All other commands are assumed not to require the data stored in value and therefore this value is ignored. This information is then put on the control que by a call to put_on_cntl_que. If this operation fails we deselect the point and return FALSE.

If all is well, then operate the point. To do this, a transmit buffer is obtained from the buffer pool and set the following information: function is set to SBOO_FC, relay_command.point is set to the point defined in the sbo_store array with the offset rtu_index, and relay_command.command is set to cmd. Then set the state to DESELECTED and place the buffer on the control queue.
Returns:
FALSE if unable to get a buffer from the pool, or unable to place the buffer on the control queue, otherwise returns TRUE.
Rfc-Setpoint
void rfc_setpoint(point, value, rtu_index)
USHORT point, rtu_index, value;
This routine sets the following parameters, as defined in sbo_store_struct: point is set to the parameter point, state is set to SELECTED, cmd is set to SETPOINT_CMD, value is set to the parameter value, and time is set to the number of seconds currently being reported by the system.
Rfc-Stat
USHORT rfc_stat(data_ptr, start, stop, rtu_index)
char *data_ptr;
USHORT stop, start, rtu_index;
This routine loads the most recent status into the transmit buffer pointed to by data_ptr with change detect (2 bit change), one bit change, and simple status. Status information with change detect is stored in the RTU_Database with the name of status 2bit_data. The single bit change is stored at the location status_1bit_data. The simple status is stored at the simple status location.

Both status information and analog data are returned. This data looks as follows:

| 2bit chg/data | 1bit chg/data | simple status | analog data |
|---|---|---|---|
|  |  |  |  |

The status_1bit_data array consists of 8 bit elements. Data is stored into two consecutive 8 bit elements thus each 1 bit status data element is 16 bits is size.

The status_2bit_change array two dimensional consisting of 8 bit elements. Data is stored into each byte and is indexed by the point number and reader number.

After each read of the status_2bit_change data it is reset to zero by this routine.

The status_2bit data array consists of 8 bit elements. Data is stored into each byte thus each status data element is 8 bits is size.

The status_simple_data array consists of 8 bit elements. Data is stored into two of the 8 bit elements thus each status data element is 16 bits is size.
Returns:
0 if counter_ptcnt in the RTU_Database is zero, otherwise it returns the number bytes of data placed in the buffer.
Rfc-Trip
void rfc_trip(point, rtu_index)
USHORT point, rtu_index;
This routine sets the following parameters, as defined in sbo_store_struct: point is set to the parameter point, state is set to SELECTED, cmd is set to TRIP_CMD, and time is set to the number of seconds currently being reported by the system as of Feb. 8, 1993.
Module Description
Name
Description
write_com
include "port_io\our_lib.h"
write_com(int port, struct bufstruct *message)
int port;
struct bufstruct ,message;
This routine is used to set up the port for a write. The first order of business is to determine if the port is ready. If not ready the routine will attempt twenty times and if not ready will return 0. If the I/O control fails on the port this routine will exit. If the disaster status bit is set on the returned status message this routine will call disaster_sub.

If this is successful the message will be written to the port and time message data length will be returned. If the write I/O control fails debug information will be displayed and this routine will exit.
Data
This section shall describe all of the global data elements within the OS/2AP's subsystem. It shall discuss both data elements internal to the OS/2AP's and data elements external to the OS/2AP's.

All configuration files begin with the root name of the binary which uses them, for example, the binary cdc_sm.exe configuration file is cdc_sm.cfg. The exception to this rule is that the Central.exe program uses the sta????.cfg files to initialize the RTU Databases, and records its trace information in a file named INIT_LST.TRC.
Data File: Central.Cfg
Table 6.2 shows the Central configuration file and its layout.

TABLE 6.1

Central.CFG Configuration File

| Item | Attribute Name | Number of fields |
|---|---|---|
| 1 | RTU station number | 1 |
| 2 | debug cfg | 1 |
| 3 | site list file | 1 |
| 4 | local site name | 1 |
| 5 | pgm, config and logdir | 3 |

Data File: STA????.CFG

Table 6.2 shows the STA???? configuration file and its layout.

| Item | Attribute Name | Number of fields |
|---|---|---|
| 1 | RTU station number | 1 (int) |
| 2 | debug cfg | 1 (int) |
| 3 | RTU type | 1 (string) |
| 4 | station name | 1 (string) |
| 5 | start analog | 1 (int) |
| 6 | start 2bit chg | 1 (int) |
| 7 | analog ptcnt | 1 (int) |
| 8 | analog offset | 1 (int) |
| 9 | num 2bit chg | 1 (int) |
| 10 | analog points per card | 1 (int) |
| 11 | digital points per card | 1 (int) |
| 12 | poll type start stop | 1 (int) |
| 13 | control and status | 2 (int) (int) |
| 14 | control operate time | 1 (int) |
| 15 | anlg pt and name | 2 (int) (string) |
| 16 | anlg pt addr mult | 3 (int) (real) (real) |
| 17 | anlg pt upper lower | 3 (int) (real) (real) |

Table 6.2 STA????.CFG Station Configuration File
Data File: X25_DBX.CFG
Table 6.3 shows the X25_DBX configuration file and its layout.

| Item | Attribute Name | Number of fields |
|---|---|---|
| 1 | site list file | 1 (string) |
| 2 | local site name | 1 (string) |
| 3 | x25 address | 1 (int) |
| 4 | vsat cable | 1 (int) |
| 5 | primary dual port | 1 (int) |
| 6 | keep alive time out | 1 (int) |
| 7 | RTU station number | 1 (int) |

Table 6.3 X25_DBX.CFG Configuration File
Data File: O22_SM.CFG
Table 6.4 shows the O22_SM configuration file and its layout.

| Item | Attribute Name | Number of fields |
|---|---|---|
| 1 | terminal unit cable | 1 (int) |
| 2 | debug cfg | 1 (int) |
| 3 | primary dual port | 1 (int) |
| 4 | RTU poll interval | 1 (int) |
| 5 | RTU addr vs station num | 2 (int) (int) |
| 6 | baud rate | 1 (int) |

Table 6.4 O22_SM.CFG Configuration File
Data File: CDC_SM.CFG
Table 6.5 shows the CDC_SM configuration file and its layout.

| Item | Attribute Name | Number of fields |
|---|---|---|
| 1 | terminal unit cable | 1 (int) |
| 2 | debug cfg | 1 (int) |
| 3 | primary dual port | 1 (int) |
| 4 | RTU poll interval | 1 (int) |
| 5 | RTU addr vs station num | 2 (int) (int) |
| 6 | baud rate | 1 (int) |

Table 6.5 CDC_SM.CFG Configuration File
Data File: CDC_SR.CFG
Table 6.6 shows the CDC_SR.CFG configuration file and its layout.

| Item | Attribute Name | Number of fields |
|---|---|---|
| 1 | terminal unit cable | 1 (int) |
| 2 | debug cfg | 1 (int) |
| 3 | primary dual port | 1 (int) |
| 4 | RTU poll interval | 1 (int) |
| 5 | RTU addr vs station num | 2 (int) (int) |
| 6 | baud rate | 1 (int) |

Table 6.6 CDC_SR.CFG Configuration File
Data File: TSP_DIAL.CFG
Table 6.7 shows the TSP_DIAL configuration file and its layout.

| Item | Attribute Name | Number of fields |
|---|---|---|
| 1 | site list file | 1 (string) |
| 2 | local site name | 1 (string) |
| 3 | X25 address | 1 (int) |
| 4 | primary dual port | 1 (int |
| 5 | vsat cable | 1 (int) |

Table 6.7 TSP_DIAL.CFG Station Configuration File
Data File: INIT_LST.TRC

The INIT_LST.TRC file is a trace of the Central start-up process. The information in this file is for written and never read by Central.exe. It is intended for viewing purposes only.

Advantages

Advantages of the VCC include the following features:

The VCC handles at least four protocols simultaneously through asynchronous and synchronous ports. A single internal card allows six asynchronous and two synchronous terminal connections.

The VCC allows simultaneous compressed voice and SCADA traffic through separate ports with the ability to designate priority traffic under peak data throughput conditions.

The VCC can communicate simultaneously with RTU's using CDC Type 1, CDC Type 2, L&N, Systems Northwest, and other protocols. IBM 3270, SNA and X.25 protocols can be handled simultaneously through the multiple ports of the VCC.

Multiple Control Centers using different computer systems and communication protocols can access data from a single substation RTU with only one designated to have control. In this manner a single substation device can give one master station data acquisition access, while another master station can be given data access and control capability through a different VCC port. Or one center can be given switching access, a second Automatic Generation Control access and a third monitoring access only. All through separate ports of the VCC.

Different locations can be given monitoring access only with different scan rates and data subsets through designated VCC ports.

The VCC an withstand the harsh EMI environment of a substation and allow interface connections with RTU's, Supervisory Alarm and Monitoring Panels, Programmable Logic Controllers, Opto-22, Enunciator Alarm/Data/Control and Compressed Voice systems through separate ports.

A single VCC can simultaneously be connected to satellite, fiber optic, hardware, microwave, radio and other digital communication technologies.

The VCC eliminates costly hardware/software modifications of existing Power System Control Center applications with the introduction of new substation monitoring and control equipment using different protocols or communication media with communication link delays.

At the remote substation end the VCC simulates the master SCADA computer and at the Regional Control Center location it simulates the remote RTU. In this way it can provide a transparent interface to the power system control software applications with the ability to allow synchronized local polling, Select-Before-Operate, and other RTU functions via either satellite or land lines.

The VCC allows local displays of entire substation data transmitted to the master control SCADA site.

Time stamped synchronized sequence-of-events data can be obtained using the VCC via satellite synchronization of all VCC's throughout the Power System.

The VCC provides remote diagnostic capability of the communications link and connecting RTU or other terminal equipment.

The VCC can be reconfigured over the satellite and software upgrades can be downloaded from a central site. This is made possible through secure password access. A watchdog timer allows rebooting after power supply or other interruptions without manual intervention.

By establishing virtual switching circuits the VCC's can be used on a network to establish compressed voice connections between remote VCC's.

It permits dynamic poll synchronization to lock in on a new poll reference time after, for example, select-before-operate sequence.

The VCC is capable of operating from an AC or 48/130 VDC nominal power supply source and meets the IEEE switching surge withstand.

The VCC has a hard drive or semi-conductor memory back-up to facilitate turn-on and turn-off situations.

The VCC allows synchronous and asynchronous communications through individual ports and permits implementation of logical functions involving priority of traffic at a protocol level above the X.25.

General

Many different forms of the invention are possible. Different embodiments of the system can have the characteristics of detecting a transient in at least one of the multiple input signals and means for communicating a detected transient signal; the display being in a selected real time or late time display; limiting the selected second controller means from communicating control signals to first locations; adjusting a polling time interval for transmitting signals; transmitting monitored data by multiple selected common protocols; storing a sequence of events leading to a transient for later transmission; and remotely altering the number of control signals without interrupting collection of the monitoring signals. The scope of the invention is to be determined solely by the following claims.

We claim:

1. Apparatus for communicating signals having multiple different protocols as a composite signal with at least one common protocol comprising:

multiple input means for receiving respective input signals in different protocols selected from the multiple protocols, the inputted signals being representative of monitoring signals at a first location, first controller means for receiving the inputted signals and including means for multiplexing the input signals to a composite signal having a common protocol, and output means for receiving the composite signal in the common protocol and for transmitting the composite signal in the common protocol through a communication medium to a second location.

2. Apparatus as claimed in claim 1 including at least one second controller means at the second location, input means in the second controller means for receiving the composite signal from the communication medium, means in the second controller means for demultiplexing the composite signal into multiple output signals having the respective multiple different protocols, output means for presenting the outputting signals as monitoring signals, and the first location being a remote station and the second location being a central station.

3. Apparatus for communicating signals having multiple different protocols as a composite signal with at least one common protocol comprising:

multiple input means for receiving respective input signals in a protocol of the multiple protocols, the inputted signals being representative of control signals at a first location, at least several of the multiple signals having one of a different protocol from the multiple protocols, first controller means for receiving the inputted signals and including means for multiplexing the inputted signals to a composite signal having a common protocol, and output means for receiving the composite signal in the common protocol and for transmitting the composite signal in the common protocol through a communication medium to a second location.

4. Apparatus as claim in claim 3 including at least one second controller means at the second location, input means in the second controller means for receiving the composite signal from the communication medium, means in the second controller means for demultiplexing the composite signal into multiple output signals having the respective multiple different protocols, output means for presenting the outputted signals as control signals, the first location being a control station and the second location being a remote station.

5. Apparatus for communicating signals having multiple different protocols as a composite signal with at least one common protocol comprising:

multiple means for receiving respective input signals in different protocols of the multiple protocols and outputting output signals in a protocol of the multiple protocols, the inputted signals being representative of monitoring signals and the outputted signals being representative of control signals respectively at multiple first locations, multiple first controller means at respective first locations for receiving the inputted signals and including means for multiplexing the inputted signals to a composite monitoring signal having a common protocol and including means for demultiplexing a composite control signal in the common protocol into multiple signals in the multiple control protocols, and means for transmitting and receiving the monitoring and control signal in the common protocol through a communication medium to at least one second location.

6. Apparatus as claimed in claim 5 including at least one second controller means at the second location, input means in the second controller means for receiving the composite monitoring signal from the communication medium, means in the second controller means for demultiplexing the composite monitoring signal into multiple output monitoring signals having the respective multiple different protocols, and means for multiplexing multiple control signals in multiple protocols into a composite control signal in a common protocol, the first location being a remote station for transmitting monitoring signals and the second location being a central station for transmitting control signals.

7. Apparatus as claimed in claim 2 wherein the output signals at the second location represent the monitoring signals in a substantially same manner as the input signals at the first location.

8. Apparatus as claimed in claim 4 wherein the output signals at the second location represent the control signals in a substantially same manner as the input signals at the first location.

9. Apparatus as claimed in claim 6 wherein the output signals at the second location represent the monitoring signals in a substantially same manner as the input signals at the first location.

10. Apparatus as claimed in claim 1 wherein the first controller means includes multiple serial inputs and wherein at least some of the inputs selectively have substantially the same protocols with each other.

11. Apparatus as claimed in claim 3 wherein the first controller means includes multiple serial inputs and wherein at least some of the inputs selectively have substantially the same protocols with each other.

12. Apparatus as claimed in claim 5 wherein the first controller means includes multiple serial inputs and wherein at least some of the inputs selectively have substantially the same protocols with each other.

13. Apparatus as claimed in any one of claims 1, 3 or 5 wherein the first controller means includes means for receiving the multiple protocols selectively in a synchronous or asynchronous data format, and including means for processing such data format into the composite signal having a common protocol.

14. Apparatus as claimed in any one of claims 1, 3 or 5 wherein the controller means includes means for receiving voice signals, and including means for digitizing the voice signal and for multiplexing the digitized voice signal for transmission in the common protocol.

15. Apparatus as claimed in any one of claims 1, 3 or 5 including means for displaying at the second location signals representative of the input signals communication from at least one first location.

16. Apparatus as claimed in any one of claims 2, 4 or 6 including means for displaying at the first location signals representative of signals emanating from the second location.

17. Apparatus as claimed in any one of claims 1, 3 or 5 wherein the common protocol is includes an X.25 protocol and the communication medium is selected to be at least one of an electronic, fiber optic, or satellite medium.

18. Apparatus as claimed in any one of claims 2, 4 or 6 wherein the common protocol is includes an X.25 protocol and the communication medium is selected to be at least one of an electronic, fiber optic, or satellite medium.

19. Apparatus as claimed in claim 1 including sensor means at the first location, the sensor means being integrated into the controller means.

20. Apparatus as claimed in claim 5 including sensor means at a first location, the sensor means being integrated into the first controller means.

21. Apparatus as claimed in any one of claims 1 to 6 including means for polling the multiple input means receiving the respective input signals in the selected protocol thereby to obtain a polled input signal.

22. Apparatus for communicating signals comprising:

multiple input means for receiving respective input signals in different protocols selected from multiple protocols, the inputted signals being representative of monitoring signals at a first location being a remote station, first controller means for receiving the inputted signals and including means for multiplexing the input signals to a composite signal having a common protocol, output means for receiving the composite signal in the common protocol and for transmitting the composite signal in the common protocol through a communication medium to a second location being a control station, at least one second controller means at the second location, input means in the second controller means for receiving the composite signal from the communication medium, means in the second controller means for demultiplexing the composite signal into multiple output signals having the respective multiple different protocols, and output means for presenting the outputted signals as monitoring signals, such that the outputted signals at the central station are substantially the same as the inputted signals received by the respective multiple input means.

23. Apparatus for communicating signals comprising:

multiple input means for receiving respective input signals in different protocols, the inputted signals being representative of control signals at a first location being a control station, first controller means for receiving the inputted signals and including means for multiplexing the inputted signals to a composite signal having a common protocol, output means for receiving the composite signal in the common protocol and for transmitting the composite signal in the common protocol through a communication medium to a second location being a remote station, at least one second controller means at the second location, input means in the second controller means for receiving the composite signal from the communication medium, means in the second controller means for demultiplexing the composite signal into multiple output signals having the respective multiple different protocols, and output means for presenting the outputted signals as control signals, such that the outputted signals at the remote station are substantially the same as the inputted signals received by the respective multiple input means.

24. Apparatus for communicating signals comprising:

multiple means for receiving respective input signals in different protocols and outputting output signals in different protocols, the inputted signals being representative of monitoring signals and the outputted signals being representative of control signals respectively at multiple first locations, multiple first controller means at respective first locations for receiving the inputted signals and including means for multiplexing the inputted signals to a composite monitoring signal having a common protocol and including means for demultiplexing a composite signal in the common protocol into multiple control signals in the multiple protocols, output means for transmitting and receiving the composite monitoring and control signal in the common protocol through a communication medium to at least one second location, second controller means at the second location, input means in the second controller means for receiving the composite signal from the communication medium, means in the second controller means for demultiplexing the composite signal into multiple output signals having the respective multiple different protocols, and including means for multiplexing multiple signals in multiple protocols into a composite signal in the common protocol, output means for presenting the outputted signals at the second location as monitoring signals and control signals at the first location respectively, the first locations being a remote station for transmitting monitoring signals and the second location being a central station for transmitting control signals, and means for selectively communicating signals representative of voice between selected different first locations independently of the second locations.

25. Apparatus for communicating signals comprising:

multiple means for receiving respective input signals in different protocols and outputting output signals in different protocols, the inputted signals being representative of monitoring signals and the outputted signals being representative of control signals respectively at multiple first locations, multiple first controller means at respective first locations for receiving the inputted signals and including means for multiplexing the inputted signals to a composite monitoring signal having a common protocol and including means for demultiplexing a composite signal in the common protocol into multiple control signals in the multiple protocols, output means for transmitting and receiving the composite monitoring and control signal in the common protocol through a communication medium to at least one second location, second controller means at the second location, input means in the second controller means for receiving the composite signal from the communication medium, means in the second controller means for demultiplexing the composite signal into multiple output signals having the respective multiple different protocols, and including means for multiplexing multiple signals in multiple protocols into a composite signal in the common protocol, and output means for presenting the outputted signals at the second location as monitoring signals and control signals at the first location respectively, the first locations being a remote station for transmitting monitoring signals and the second location being a central station for transmitting control signal.

26. Apparatus for communicating signals comprising:

multiple means for receiving respective input signals in different protocols and outputting output signals in different protocols, the inputted signals being representative of monitoring signals and the outputted signals being representative of control signals respectively at multiple first locations, multiple first controller means at respective first locations for receiving the inputted signals and including means for multiplexing the inputted signals to a composite monitoring signal having a common protocol and including means for demultiplexing a composite signal in the common protocol into multiple control signals in the multiple protocols, output means for transmitting and receiving the composite monitoring and control signal in the common protocol through a communication medium to at least one second location, second controller means at the second location, input means in the second controller means for receiving the composite signal from the communication medium, means in the second controller means for demultiplexing the composite signal into multiple output signals having the respective multiple different protocols, and including means for multiplexing multiple signals in multiple protocols into a composite signal in the common protocol, output means for presenting the outputted signals at the second location as monitoring signals and control signals at the first location respectively, the first locations being a remote station for transmitting monitoring signals and the second location being a central station for transmitting control signals, and means associated with the first controller means for displaying monitored data in an integrated manner to the first locations.

27. A method for communicating signals having multiple different protocols as a composite signal with at least one common protocol comprising:

receiving respective input signals in different protocols selected from the multiple protocols, the inputted signals being representative of monitoring signals at a first location, receiving in a first controller means the inputted signals and including multiplexing the input signals to a composite signal having a common protocol, and transmitting the composite signal in the common protocol through a communication medium to a second location.

28. A method as claimed in claim 27 including at least one second controller means at the second location for receiving the composite signal from the communication medium, demultiplexing in the second controller the composite signal into multiple output signals having the respective multiple different protocols, presenting the outputted signals as monitoring signals, and the first location being a remote station and the second location being a central station.

29. A method for communicating signals having multiple different protocols as a composite signal with at least one common protocol comprising:

inputting respective multiple input signals in a protocol selected from the different multiple protocols, the inputted signals being representative of control signals at a first location, receiving in a first controller means the inputted signals and including multiplexing the inputted signals to a composite signal having a common protocol, and transmitting the composite signal in the common protocol through a communication medium to a second location.

30. A method as claimed in claim 29 including at least one second controller means at the second location for receiving the composite signal from the communication medium, demultiplexing in the second controller the composite signal into multiple output signals having the respective multiple different protocols, presenting the outputted signals as control signals, the first location being a control station and the second location being a remote station.

31. A method for communicating signals having multiple different protocols as a composite signal with at least one common protocol comprising:

inputting multiple signals in different protocols being representative of monitoring signals at multiple first locations, outputting multiple signals being representative of control signals at the multiple first locations, receiving in multiple first controller means at the respective multiple first locations the inputted monitoring signals and including multiplexing the inputted monitoring signals to a composite monitoring signal having a common protocol, receiving in the multiple first controller means at the respective multiple first locations a composite control signal having a common protocol and demultiplexing the composite signal in the common protocol into multiple control signals in the multiple protocols, and transmitting the composite monitoring signal in the common protocol through a communication medium to a second location.

32. A method as claimed in claim 31 including at least one second controller means at the second location for receiving the composite monitoring signal from the communication medium and for outputting a composite control signal, demultiplexing in the second controller the composite monitoring signal into multiple output monitoring signals having the respective multiple different protocols, presenting the outputted monitoring signals at the second location, multiplexing in the second controller multiple control signals in different protocols into a composite control signal in a common protocol, the first locations being remote stations for transmitting the composite monitoring signals and for receiving the composite control signal and the second location being a central station for receiving the composite monitoring signal and for transmitting the composite control signal.

33. A method as claimed in claim 28 wherein the output signals at the second location represent the monitoring signals in a substantially same manner as the input signals at the first location.

34. A method as claimed in claim 30 wherein the output signals at the second location represent the monitoring signals in a substantially same manner as the input signals at the first location.

35. A method as claimed in claim 32 wherein the output signals at the second location represent the monitoring signals in a substantially same manner as the input signals at the first location.

36. A method as claimed in claim 29 including inputting the signals serially and wherein at least some of the inputs selectively have substantially the same protocols with each other.

37. A method as claimed in claim 32 including inputting the signals serially and wherein at least some of the inputs selectively have substantially the same protocols with each other.

38. A method as claimed in claim 31 including inputting the signals serially and wherein at least some of the inputs selectively have substantially the same protocols with each other.

39. A method as claimed in any one of claims 27, 29 or 31 wherein the first controller means receives the multiple protocols selectively in a synchronous or asynchronous data format, and including processing such data format into the composite signal having a common protocol.

40. A method as claimed in any one of claims 27, 29, or 31 wherein the controller means receives voice signals, and digitizing the voice signal and multiplexing the digitized voice signal for transmission in the common protocol.

41. A method as claimed in any one of claims 27, 29 or 31 including displaying at the second location signals representative of the input signals communicated from at least one first location.

42. A method as claimed in any one of claims 28, 30 or 32 including displaying at the first location signals representative of signals emanating from the second location.

43. A method as claimed in any one of claims 27, 29 or 31 wherein the common protocol includes an x.25 protocol and the communication medium is selected to be at least one of an electronic, fiber optic, or satellite medium.

44. A method as claimed in any one of claims 28, 30, or 32 wherein the common protocol include an X.25 protocol and the communication medium is selected to be at least one of an electronic, fiber optic, or satellite medium.

45. A method as claimed in any one of claims 27 to 32 including polling the multiple input means receiving the respective input signals in the selected protocol thereby to obtain a polled input signal.

46. A method as claimed in any one of claims 27 to 32 including selecting input signals from the multiple input means receiving the respective input signals in the selected protocol thereby to obtain a selected input signal.

* * * * *